United States Patent
Umebayashi

(10) Patent No.: US 9,855,693 B2
(45) Date of Patent: Jan. 2, 2018

(54) IMAGE FORMATION METHOD, DECORATIVE SHEET, DECORATIVE SHEET MOLDING, PROCESS FOR PRODUCING IN-MOLD MOLDED PRODUCT, IN-MOLD MOLDED PRODUCT, AND INK SET

(71) Applicant: FUJIFILM Corporation, Tokyo (JP)

(72) Inventor: Tsutomu Umebayashi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 346 days.

(21) Appl. No.: 14/471,056

(22) Filed: Aug. 28, 2014

(65) Prior Publication Data

US 2015/0064398 A1 Mar. 5, 2015

(30) Foreign Application Priority Data

Aug. 30, 2013 (JP) .................. 2013-180184

(51) Int. Cl.

| | | |
|---|---|---|
| C08J 7/04 | (2006.01) |
| B29C 45/14 | (2006.01) |
| B41M 7/00 | (2006.01) |
| C09D 11/54 | (2014.01) |
| B29C 45/16 | (2006.01) |
| B41J 11/00 | (2006.01) |
| C09D 133/08 | (2006.01) |
| C09D 133/14 | (2006.01) |
| C09D 177/02 | (2006.01) |
| B29C 37/00 | (2006.01) |
| C09D 11/101 | (2014.01) |
| C09D 11/40 | (2014.01) |
| B41M 3/00 | (2006.01) |
| B29L 9/00 | (2006.01) |
| B29C 35/08 | (2006.01) |
| C08F 226/06 | (2006.01) |
| C08F 220/18 | (2006.01) |
| C08F 220/30 | (2006.01) |

(52) U.S. Cl.
CPC .... *B29C 45/14688* (2013.01); *B29C 37/0028* (2013.01); *B29C 45/1679* (2013.01); *B41J 11/002* (2013.01); *B41M 7/0081* (2013.01); *C09D 11/101* (2013.01); *C09D 11/40* (2013.01); *C09D 11/54* (2013.01); *C09D 133/08* (2013.01); *C09D 133/14* (2013.01); *C09D 177/02* (2013.01); *B29C 35/0805* (2013.01); *B29C 35/0866* (2013.01); *B29C 2035/0827* (2013.01); *B29C 2035/0833* (2013.01); *B29C 2037/0042* (2013.01); *B29C 2045/14704* (2013.01); *B29C 2045/14713* (2013.01); *B29C 2045/14737* (2013.01); *B29L 2009/005* (2013.01); *B41M 3/008* (2013.01); *C08F 226/06* (2013.01); *C08F 2220/1875* (2013.01); *C08F 2220/301* (2013.01); *Y10T 428/24322* (2015.01); *Y10T 428/24521* (2015.01); *Y10T 428/24851* (2015.01)

(58) Field of Classification Search
None
See application file for complete search history.

(56) References Cited

FOREIGN PATENT DOCUMENTS

| | | |
|---|---|---|
| JP | 2002-273830 A | 9/2002 |
| JP | 2008-087244 A | 4/2008 |
| JP | 2009-185186 A | 8/2009 |
| JP | 2009-209353 A | 9/2009 |
| JP | 2010-235697 A | 10/2010 |
| JP | 2011-225824 A | 11/2011 |

*Primary Examiner* — Robert S Walters, Jr.
(74) *Attorney, Agent, or Firm* — Studebaker & Brackett PC

(57) ABSTRACT

The object of the present invention is to provide an image formation method that can give an image that is excellent in terms of adhesion to a substrate, blocking resistance of a resulting printed material, and molding suitability, in particular vacuum forming properties, and that can suppress post-molding cracking of a molding. Disclosed is an image formation method comprising, in order, Step a: a step of applying Liquid A to a substrate, Step b: a step of irradiating the applied Liquid A with actinic radiation so as to carry out complete curing or semi-curing up to a degree of cure of at least 90%, Step c: a step of applying Liquid B to a cured layer of the completely cured or semi-cured Liquid A, and Step d: a step of completely curing Liquid A and Liquid B.

5 Claims, No Drawings

IMAGE FORMATION METHOD, DECORATIVE SHEET, DECORATIVE SHEET MOLDING, PROCESS FOR PRODUCING IN-MOLD MOLDED PRODUCT, IN-MOLD MOLDED PRODUCT, AND INK SET

CROSS-REFERENCE TO RELATED APPLICATIONS

This application claims priority under 35 U.S.C. §119 to Japanese Patent Application No. 2013-180184 filed Aug. 30, 2013. Each of the above application is hereby expressly incorporated by reference, in its entirety, into the present application.

BACKGROUND ART

The present invention relates to an image formation method, a decorative sheet, a decorative sheet molding, a process for producing an in-mold molded product, an in-mold molded product, and an ink set.

As image recording methods for forming an image on a recording medium such as paper or plastic based on an image data signal, there are an electrophotographic system, sublimation type and melt type thermal transfer systems, a screen printing system, an inkjet system, etc. The electrophotographic method has the problem that it requires a process of forming an electrostatic latent image on a photosensitive drum by charging and exposure; the system becomes complicated, and as a result the production cost becomes high. The thermal transfer method has the problem that, although the equipment is inexpensive, due to the use of an ink ribbon the running cost is high, and waste material is generated. Screen printing has the problem that the cost increases due to the necessity for plate making or printing plate making, the exchange of plate and ink, and frequent setup operations such as setting of printing conditions.

On the other hand, with regard to the inkjet system, the printing equipment is inexpensive, it is not necessary to use a plate when printing, and since an image is formed directly on a recording medium by discharging an ink composition only on a required image area, the ink composition can be used efficiently and the running cost is low, particularly in the case of small lot production. Furthermore, there is little noise and it is excellent as an image recording system, and has been attracting attention in recent years.

Among them, an inkjet recording ink composition (radiation-curing inkjet recording ink composition), which is curable upon exposure to radiation such as UV rays, is an excellent system from the viewpoint of it being possible to print on various types of substrates because, compared with a solvent-based ink composition, the drying properties are excellent and an image is resistant to spreading since the majority of the components in the ink composition cure upon exposure to radiation such as UV rays.

It is also possible to produce a molding using the inkjet method using this radiation curable inkjet ink. One example of the molding includes a molding produced by forming an ink image on a plastic medium, irradiating it with actinic radiation to thus cure the image, and then heating and softening the substrate to thus freely change the shape.

A conventional 3D plastic molding is usually produced by an image formation process that involves screen printing and then subjecting it to vacuum forming (ref. e.g. JP-A-2002-273830). On the other hand, processes for producing a plastic molding using an inkjet method have been developed in recent years (ref. e.g. JP-A-2009-185186, JP-A-2010-235697, JP-A-2009-209353, JP-A-2011-225824, JP-A-2008-087244).

SUMMARY OF INVENTION

It is an object of the present invention to provide an image formation method that can give an image that is excellent in terms of adhesion to a substrate, blocking resistance of a resulting printed material, and molding suitability, in particular vacuum forming properties, and that can suppress post-molding cracking of a molding. In particular, it is to provide an image formation method that can give an image for which hardly any abrasion due to a mold occurs even when molding is carried out for a hard substrate such as polycarbonate, in particular a hard substrate such as polycarbonate having a thickness of 1 mm to 3 mm. Furthermore, it is to provide a decorative sheet using the image formation method, a decorative sheet molding, a process for producing an in-mold molded product, an in-mold molded product, and an ink set used in the image formation method.

The objects have been accomplished by means described in <1>, <6>, <7>, and <9> to <11>. They are shown below together with <2> to <5>, and <8>, which are preferred embodiments.

<1> An image formation method comprising, in order, Step a: a step of applying Liquid A to a substrate, Step b: a step of irradiating the applied Liquid A with actinic radiation so as to carry out complete curing or semi-curing up to a degree of cure of at least 90%, Step c: a step of applying Liquid B to a cured layer of the completely cured or semi-cured Liquid A, and Step d: a step of completely curing Liquid A and Liquid B, Liquid A comprising N-vinylcaprolactam as Component A, an aromatic ring-containing monofunctional acrylate as Component B, an aliphatic hydrocarbon ring-containing monofunctional acrylate as Component C, a polysiloxane compound as Component D, an acrylic resin having a glass transition temperature of 40° C. to 90° C. as Component E, a photopolymerization initiator as Component F, and a pigment as Component G, the content of Component E in Liquid A being at least 0.5 mass % but no greater than 5 mass %, and Liquid B comprising N-vinylcaprolactam as Component A, an aromatic ring-containing monofunctional acrylate as Component B, a polysiloxane compound as Component D, a thermoplastic resin having a glass transition temperature of 70° C. to 110° C. as Component H, and a photopolymerization initiator as Component F, the content of Component H in Liquid B being at least 20 mass % but no greater than 50 mass %, <2> the image formation method according to <1>, wherein Step a is carried out by inkjet printing, <3> the image formation method according to <1> or <2>, wherein Step c is carried out by roll coater printing and/or screen printing, <4> the image formation method according to any one of <1> to <3>, wherein the interval between Step c and Step d is no greater than 10 seconds, <5> the image formation method according to any one of <1> to <4>, wherein Liquid A further comprises a difunctional aliphatic urethane acrylate oligomer as Component I, and the content of Component I in Liquid A is at least 0.5 mass % but no greater than 3.0 mass %, <6> the image formation method according to any one of <1> to <5>, wherein the substrate is a sheet of a resin selected from the group consisting of polystyrene, an ABS resin, an acrylic resin, polyethylene terephthalate, and polycarbonate, <7> the image formation method according to any one of <1> to <6>, wherein the substrate has a thickness of 0.5 to 4 mm, <8> the image formation method according to any one of <1> to <7>, wherein Liquid A comprises a monofunctional polymerizable compound (preferably a monofunctional polymerizable monomer) in an amount of at least 95 mass % of the entire polymerizable compound (more preferably at least 98 mass %), <9> the image formation method according to any one of <1> to <8>, wherein Liquid A comprises Component A in an amount of 5 to 40 mass % (more preferably 10 to 30 mass %) relative to the total mass of Liquid A, <10> the image formation method according to any one of <1> to <9>, wherein Liquid B comprises Component A in an amount of 5 to 30 mass % (more preferably 10 to 25 mass %) relative to the total mass of Liquid B, <11> the image formation method according to any one of <1> to <10>, wherein Component B is phenoxyethyl acrylate, <12> the image formation method according to any one of <1> to <11>, wherein Liquid A comprises Component B in an amount of 5 to 70 mass % relative to the total mass of Liquid A (more preferably 7 to 50 mass %, and yet more preferably 10 to 30 mass %), <13> the image formation method according to any one of <1> to <12>, wherein Liquid B comprises Component B in an amount of 1 to 70 mass % relative to the total mass of Liquid B (more preferably 5 to 40 mass %, and yet more preferably 10 to 30 mass %), <14> the image formation method according to any one of <1> to <13>, wherein Component C is selected from the group consisting of 3,3,5-trimethylcyclohexyl acrylate, t-butylcyclohexyl acrylate, and isobornyl acrylate, <15> the image formation method according to any one of <1> to <14>, wherein Liquid A comprises Component C in an amount of 10 to 50 mass % relative to the total mass of Liquid A (more preferably 20 to 50 mass %, and yet more preferably 35 to 45 mass %), <16> the image formation method according to any one of <1> to <15>, wherein Liquid B comprises Component C, the content of Component C being 5 to 70 mass % relative to the total mass of Liquid B (more preferably 7 to 50 mass %, and yet more preferably 10 to 30 mass %), <17> the image formation method according to any one of <1> to <16>, wherein Liquid A comprises Component D in an amount of 0.1 to 10 mass % relative to the total mass of Liquid A (more preferably 0.5 to 5 mass %, and yet more preferably 1 to 3 mass %), <18> the image formation method according to any one of <1> to <17>, wherein Liquid B comprises Component D in an amount of 0.1 to 10 mass % relative to the total mass of Liquid B (more preferably 0.5 to 5 mass %, and yet more preferably 1 to 3 mass %), <19> the image formation method according to any one of <1> to <18>, wherein Component E has a glass transition temperature of 60° C. to 90° C. (more preferably 70° C. to 90° C.), <20> the image formation method according to any one of <1> to <19>, wherein Liquid A comprises Component E in an amount of 0.7 to 4 mass % relative to the total mass of Liquid A (more preferably 1 to 3 mass %), <21> the image formation method according to any one of <1> to <20>, wherein Component E has a weight-average molecular weight of 3,000 to 100,000 (more preferably 3,000 to 80,000, and yet more preferably 3,000 to 50,000), <22> the image formation method according to any one of <1> to <21>, wherein Component E is a copolymer of two or more types of methacrylic compounds selected from the group consisting of methyl methacrylate, n-butyl methacrylate, phenoxyethyl methacrylate, tetrahydrofurfuryl methacrylate, 2-ethylhexyl methacrylate, isodecyl methacrylate, methoxypolyethylene glycol methacrylate, n-lauryl methacrylate, cyclohexyl methacrylate, and t-butyl methacrylate (more preferably a copolymer of methyl methacrylate and a methacrylic compound selected from the group consisting of n-butyl methacrylate, t-butyl methacrylate, phenoxyethyl methacrylate, tetrahydrofurfuryl methacrylate, 2-ethylhexyl methacrylate, isodecyl methacrylate, methoxypolyethylene glycol methacrylate, and n-lauryl methacrylate, and yet more preferably a copolymer of methyl methacrylate and n-butyl methacrylate or t-butyl methacrylate), <23> the image formation method according to any one of <1> to <22>, wherein Component H has a glass transition temperature of 80° C. to 110° C., <24> the image formation method according to any one of <1> to <23>, wherein Liquid B comprises Component H in an amount of 20 to 40 mass % relative to the total mass of Liquid B (more preferably 20 to 30 mass %), <25> the image formation method according to any one of <1> to <24>, wherein Component H has a weight-average molecular weight of 10,000 to 200,000 (more preferably 20,000 to 200,000, and yet more preferably 20,000 to 100,000), <26> the image formation method according to any one of <1> to <25>, wherein Component H is a homopolymer of methyl methacrylate, or a copolymer of two or more types of methacrylic compounds selected from the group consisting of methyl methacrylate, n-butyl methacrylate, phenoxyethyl methacrylate, tetrahydrofurfuryl methacrylate, 2-ethylhexyl methacrylate, isodecyl methacrylate, methoxypolyethylene glycol methacrylate, n-lauryl methacrylate, cyclohexyl methacrylate, and t-butyl methacrylate (more preferably a homopolymer of methyl methacrylate, or a copolymer of methyl methacrylate and a methacrylic compound selected from the group consisting of n-butyl methacrylate, t-butyl methacrylate, phenoxyethyl methacrylate, tetrahydrofurfuryl methacrylate, 2-ethylhexyl methacrylate, isodecyl methacrylate, methoxypolyethylene glycol methacrylate, and n-lauryl methacrylate, and yet more preferably a homopolymer of methyl methacrylate or a copolymer of methyl methacrylate and n-butyl methacrylate or t-butyl methacrylate), <27> the image formation method according to any one of <1> to <26>, wherein Liquid A and Liquid B comprise a photopolymerization initiator having a molecular weight of at least 250 (more preferably at least 280, yet more preferably at least 300) in an amount of at least 50 mass % of the total amount of photopolymerization initiator (more preferably at least 80 mass %, yet more preferably at least 90 mass %, and particularly preferably 100 mass %), <28> the image formation method according to any one of <1> to <27>, wherein Liquid A and Liquid B comprise at least one photopolymerization initiator selected from the group consisting of an acylphosphine oxide compound, a benzophenone compound, an α-hydroxyketone compound, an α-aminoketone compound, and a ketal compound (more preferably at least one photopolymerization initiator selected from the group consisting of an acylphosphine oxide compound, an α-aminoketone compound, and an α-hydroxyketone compound, and yet more preferably at least an acylphosphine oxide compound) as Component F, <29> a decorative sheet comprising, above a resin sheet, a cured image layer obtained by the image formation method according to any one of <1> to <28>,
<30> a decorative sheet molding obtained by vacuum forming, pressure forming, or vacuum/pressure forming the decorative sheet according to <29>,
<31> the decorative sheet molding according to <30>, wherein it is further subjected to hole making after vacuum forming, pressure forming, or vacuum/pressure forming,
<32> a process for producing an in-mold molded product, comprising a step of placing the decorative sheet according to <29> or the decorative sheet molding according to <30> or <31> on an inner wall of a cavity part formed by a plurality of molds, and a step of injecting molten resin into the cavity part via a gate,
<33> an in-mold molded product obtained by the process according to <32>, and
<34> an ink set comprising Liquid A and Liquid B, Liquid A comprising N-vinylcaprolactam as Component A, an aromatic ring-containing monofunctional acrylate as Component B, an aliphatic hydrocarbon ring-containing monofunctional acrylate as Component C, a polysiloxane compound as Component D, an acrylic resin having a glass transition temperature of 40° C. to 90° C. as Component E, a photopolymerization initiator as Component F, and a pigment as Component G, the content of Component E in Liquid A being at least 0.5 mass % but no greater than 5 mass %, and Liquid B comprising N-vinylcaprolactam as Component A, an aromatic ring-containing monofunctional acrylate as Component B, a polysiloxane compound as Component D, a thermoplastic resin having a glass transition temperature of 70° C. to 110° C. as Component H, and a photopolymerization initiator as Component F, the content of Component H in Liquid B being at least 20 mass % but no greater than 50 mass %.

DESCRIPTION OF EMBODIMENTS

The present invention is explained in detail below.

In the specification, the notation 'xx to yy' means a numerical range that includes xx and yy. Furthermore, 'N-vinylcaprolactam (Component A)', etc. is also simply called 'Component A', etc., and the 'step of applying Liquid A to a substrate (Step a)', etc. is also simply called 'Step a', etc.

The notation '(meth)acrylate', etc. has the same meaning as that of 'acrylate and/or methacrylate', etc, and the same applies below.

Furthermore, in the present invention, 'mass %' has the same meaning as that of 'wt %, and 'parts by mass' has the same meaning as that of 'parts by weight'.

Moreover, a combination of preferred embodiments explained below is a more preferred embodiment.

1. Image Formation Method

The image formation method of the present invention comprises, in order, Step a: a step of applying Liquid A to a substrate, Step b: a step of irradiating the applied Liquid A with actinic radiation so as to carry out complete curing or semi-curing up to a degree of cure of at least 90%, Step c: a step of applying Liquid B to a cured layer of the completely cured or semi-cured Liquid A, and Step d: a step of completely curing Liquid A and Liquid B, Liquid A comprising N-vinylcaprolactam as Component A, an aromatic ring-containing monofunctional acrylate as Component B, an aliphatic hydrocarbon ring-containing monofunctional acrylate as Component C, a polysiloxane compound as Component D, an acrylic resin having a glass transition temperature of 40° C. to 90° C. as Component E, a photopolymerization initiator as Component F, and a pigment as Component G, the content of Component E in Liquid A being at least 0.5 mass % but no greater than 5 mass %, and Liquid B comprising N-vinylcaprolactam as Component A, an aromatic ring-containing monofunctional acrylate as Component B, a polysiloxane compound as Component D, a thermoplastic resin having a glass transition temperature of 70° C. to 110° C. as Component H, and a photopolymerization initiator as Component F, the content of Component H in Liquid B being at least 20 mass % but no greater than 50 mass %.

The image formation method of the present invention is suitable for a process for producing a decorative sheet used in molding printing, more suitable for producing a decorative sheet for vacuum forming, pressure forming, or vacuum/pressure forming, and particularly desirable for producing a decorative sheet for vacuum forming. Furthermore, it is particularly suitable for application in trimming of a decorative sheet molded product formed by molding a decorative sheet.

As a result of an intensive investigation by the present inventor, it has been found that, when using an image formation method using an inkjet method described in JP-A-2009-185186, JP-A-2010-235697, JP-A-2009-209353, JP-A-2011-225824, and JP-A-2008-087244, a vacuum forming step can be greatly simplified, but when carrying out vacuum forming using a hard substrate such as polycarbonate as a substrate, in particular a substrate such as polycarbonate having a thickness of 1 mm to 3 mm, the problem of abrasion due to a mold easily occurring during vacuum forming still remains. That is, applications of an image formation method using these conventional inkjet recording methods are limited only to a relatively flexible substrate such as polyvinyl chloride, polystyrene, or PET (polyethylene terephthalate).

The present inventor has found that by the use of an image formation method using two types of liquid compositions having different formulations, that is, Liquid A and Liquid B, the above problem can be solved, and the present invention has thus been accomplished.

That is, it has been found that, by providing a protective layer by means of Liquid B above an image layer formed by means of Liquid A, the above problem can be solved.

The image formation method of the present invention is explained below.

Step a: Step of Applying Liquid A to Substrate

The image formation method of the present invention comprises Step a: a step of applying Liquid A to a substrate (a support, a recording medium, etc.).

<Substrate>

In the present invention, the substrate is not particularly limited, and a substrate known as a recording medium or a recording material may be used. For example, paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, etc.), and paper or plastic film laminated or vapor-deposited with the metal can be cited. Furthermore, as a substrate in the present invention, a non-absorbing substrate may be suitably used.

The substrate that can be used in the present invention is not particularly limited, but when a printed material (decorative sheet) is subjected to molding, etc., a known thermoplastic plastic substrate, which is described later, may be used.

Specific examples of the thermoplastic plastic substrate include a polyolefin-based resin such as polyethylene, polypropylene, polymethylpentene, polybutene, or an olefin-based thermoplastic elastomer, a polyester resin such as polyethylene terephthalate, polybutylene terephthalate, polyethylene naphthalate, a terephthalic acid-isophthalic acid-ethylene glycol copolymer, a terephthalic acid-ethylene glycol-1,4-cyclohexanedimethanol copolymer, or a polyester-based thermoplastic elastomer, a polyamide resin such as nylon 6, nylon 9, or nylon 6,6, a fluorine-based resin such as polyvinyl fluoride, polyvinylidene fluoride, polyvinylidene trifluoride, an ethylene-tetrafluoroethylene copolymer, or polytetrafluoroethylene, an acrylic resin, polyvinyl chloride, polystyrene, and polycarbonate. With regard to the acrylic resin, for example, a resin such as polymethyl (meth)acrylate, polyethyl (meth)acrylate, polybutyl (meth)acrylate, a methyl (meth)acrylate-butyl (meth)acrylate copolymer, an ethyl (meth)acrylate-butyl (meth)acrylate copolymer, a methyl (meth)acrylate-styrene copolymer, or an acrylonitrile-butadiene-styrene copolymer (ABS resin) may be used on its own or as a mixture of two or more types. Among them, in terms of ease of decorative printing and excellence of various aspects of resistance of a finished molding, a sheet of a resin selected from the group consisting of polystyrene, an ABS resin, an acrylic resin, polyethylene terephthalate, and polycarbonate is preferably used.

Furthermore, since particularly outstanding effects can be obtained in terms of trimming suitability, it is particularly preferable to use polycarbonate as a substrate.

It is possible to add an appropriate additive to the thermoplastic resin sheets as necessary. As the additive, various types of additive may be added in an appropriate amount such that they do not impair surface gloss or thermal behavior such as melting point. Examples thereof include a UV absorber such as a benzotriazole-based, benzophenone-based, etc. a photostabilizer such as a hindered amine-based radical scavenger, a lubricant such as a silicone resin or a wax, a colorant, a plasticizer, a heat stabilizer, an antimicrobial agent, an anti-mold agent, and an antistatic agent.

In the present invention, a decorative sheet molding (molded printed material) is prepared by subjecting a thermoplastic resin sheet to vacuum forming, etc., an image being formed on the substrate by means of Liquid A prior to molding. An image is usually formed on the reverse side of a transparent sheet (the side that faces the mold in vacuum forming, etc.), but an image may also be formed on the opposite side. Depending on the circumstances, an image may be formed only the opposite side, and in this case the thermoplastic resin sheet used as a substrate need not be transparent.

A method for application of Liquid A to a substrate is not particularly limited, and may be selected as appropriate from methods that can form a desired image. Examples include gravure printing, screen printing, and inkjet methods. Among them, application of Liquid A to a substrate is preferably carried out by an inkjet method. It is preferable for it to be carried out by an inkjet method since a high-resolution image is formed without requiring a plate.

Step a in the image formation method of the present invention may employ inkjet recording equipment described in detail below.

<Inkjet Recording Device>

An inkjet recording device used in the image formation method of the present invention is not particularly limited, and any known inkjet recording device that can achieve an intended resolution may be used. That is, any known inkjet recording device, such as a commercial product, may be used in order to discharge Liquid A onto a substrate in step a of the image formation method of the present invention.

The inkjet recording device that can be used in the present invention is equipped with, for example, an ink supply system, a temperature sensor, and an actinic radiation source.

The ink supply comprises, for example, a main tank containing Liquid A, a supply pipe, an ink supply tank immediately before an inkjet head, a filter, and a piezo system inkjet head. The piezo system inkjet head may be driven so as to discharge a multisize dot of preferably 1 to 100 µL, more preferably 8 to 30 µL, at a resolution of preferably 320×320 to 4,000×4,000 dpi, more preferably 400×400 to 1,600×1,600 dpi, and yet more preferably 720× 720 dpi. Here, dpi referred to in the present invention means the number of dots per 2.54 cm.

As described above, with respect to the radiation curable composition such as Liquid A, since it is desirable for the composition to be discharged at a constant temperature, a section from the ink supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When Liquid A is discharged using the above mentioned inkjet recording device, Liquid A is preferably discharged after being heated to preferably 25° C. to 80° C., and more preferably 25° C. to 50° C., so as to reduce the viscosity of Liquid A to preferably 3 to 15 mPa·s, and more preferably 3 to 13 mPa·s. In particular, it is preferable to use Liquid A having a viscosity at 25° C. of no more than 50 mPa·s since a good discharge stability can be obtained. By employing this method, high discharge stability can be realized.

The radiation curing type composition such as Liquid A used in the present invention generally has a viscosity that is higher than that of a water-based ink composition which is usually used for an inkjet recording, and variation in viscosity due to a change in temperature at the time of discharge is large. Viscosity variation in Liquid A has a large effect on changes in liquid droplet size and changes in liquid droplet discharge speed and, consequently, causes the image quality to be degraded. It is therefore necessary to maintain Liquid A discharge temperature as constant as possible. In the present invention, the control range for the temperature of Liquid A is preferably ±5° C. of a set temperature, more preferably ±2° C. of the set temperature, and yet more preferably ±1° C. of the set temperature.

The image formation method of the present invention may be suitably used for formation of a multicolor image containing one or more Liquid A. That is, it is preferable to apply a plurality of Liquids A with various colors onto a substrate.

The order in which each of Liquid A is discharged is not particularly limited, but it is preferable to apply to a recording medium from Liquid A having a low lightness; when Liquids A of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an set comprising a total of seven colors, that is, light cyan, light magenta ink compositions and cyan, magenta, black, white, and yellow dark ink compositions may preferably be used, and in this case they are applied on top of the recording medium in the order white→light cyan→light magenta→yellow cyan→magenta→black.

In this way, Liquid A may be cured by irradiation with actinic radiation in high sensitivity and form an image on the surface of the recording medium.

When using as an set comprising plurality of compositions having a different color, the set is not particularly limited as long as it is a set having two or more types of compositions in combination, the set comprising in combination at least one Liquid A of the present invention and another Liquid A of the present invention or an ink composition other than one of the present invention, and it is preferable for the set to comprise at least one Liquid A having a color selected from cyan, magenta, yellow, black, white, light magenta, and light cyan.

In order to obtain a full color image using Liquid A of the present invention, it is preferable to use, as Liquids A, an set comprising at least four dark Liquids A of yellow, cyan, magenta, and black, it is also preferable to use a set comprising in combination five dark Liquids A of yellow, cyan, magenta, black, and white, and it is also preferable to use a set comprising in combination five dark compositions of yellow, cyan, magenta, black, and white and two light compositions of light cyan and light magenta.

The 'dark composition' referred to in the present invention means a composition for which the content of the colorant exceeds 1 mass % of the entire composition. The colorant is not particularly limited; a known colorant may be used, and examples thereof include a pigment and a disperse dye.

The dark composition and the light composition employ colorants of similar colors, the ratio of the colorant concentration of the dark composition to the colorant concentration of the light composition is preferably dark composition:light composition=15:1 to 4:1, more preferably 12:1 to 4:1, and yet more preferably 10:1 to 4.5:1. When the ratio is in the above-mentioned range, a vivid full color image with little feeling of grain can be obtained.

Step b: Step of Irradiating Applied Liquid a with Actinic Radiation so as to Carry Out Complete Curing or Semi-Curing Up to Degree of Cure of at Least 90%

The image formation method of the present invention comprises Step b: a step of irradiating the applied Liquid A with actinic radiation so as to carry out complete curing or semi-curing up to a degree of cure of at least 90%.

The 'actinic radiation' referred to in the present invention is not particularly limited as long as it is actinic radiation that can provide energy that enables an initiating species to be generated in Liquid A when irradiated, and broadly includes α rays, γ rays, X rays, UV rays, visible light, and an electron beam; among these, UV rays and an electron beam are preferable from the viewpoint of curing sensitivity and the availability of equipment, and UV rays are particularly preferable. Liquid A in the present invention is therefore preferably a composition that is curable upon exposure to UV rays as radiation.

Liquid A applied onto a substrate is irradiated with actinic radiation, thus making a curing reaction progress. This is due to a photopolymerization initiator (Component F) contained in Liquid A being decomposed by irradiation with actinic radiation, an initiating species such as a radical being generated, and the initiating species functioning to cause and promote a polymerization reaction of a polymerizable compound. In this process, if a sensitizer is co-present with the photopolymerization initiator in Liquid A, the sensitizer in the system absorbs actinic radiation, attains an excited state, and makes contact with the polymerization initiator to thus promote decomposition of the photopolymerization initiator, thus enabling a curing reaction with higher sensitivity to be achieved.

As the actinic radiation, UV ray is preferable. Although it depends on the absorption characteristics of the sensitizing dye, the peak wavelength of the UV ray is preferably, for example, 200 to 600 nm, more preferably 300 to 450 nm, and yet more preferably 350 to 420 nm.

Moreover, the polymerization initiating system of Liquid A has sufficient sensitivity even for low output UV ray. It is therefore desirable to cure it with an exposure area illumination intensity of preferably 10 to 4,000 mW/cm$^2$, and more preferably 20 to 2,500 mW/cm$^2$.

As an actinic radiation source, a mercury lamp, a gas/solid laser, etc. are mainly used, and for UV photocuring inkjet ink composition a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, the example of the LED includes a LED, disclosed in U.S. Pat. No. 6,084,250, that can emit actinic radiation whose wavelength is centered between 300 nm and 370 nm. Furthermore, another violet LED is available, and irradiation can be carried out with radiation of a different UV bandwidth. The actinic radiation source preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mW/cm$^2$.

In the present invention, Liquid A is desirably exposed to such actinic radiation preferably for 0.01 to 120 sec, and more preferably 0.1 to 90 sec.

Irradiation conditions for the actinic radiation and basic irradiation methods are disclosed in JP-A-60-132767. Specifically, light sources are provided on opposite sides of a head unit comprising an ink composition discharge system, and the head unit and the light sources are made to scan by a so-called shuttle system. Irradiation with actinic radiation is carried out after a fixed period of time (preferably 0.01 to 0.5 sec, more preferably 0.01 to 0.3 sec, and particularly preferably 0.01 to 0.15 sec) has elapsed after Liquid A has landed. By controlling the time from after Liquid A has landed until before the irradiation so that it is a very short time, it is possible to prevent Liquid A that has landed on a recording medium from spreading before being cured. Furthermore, when a porous recording medium is used, since exposure can be carried out before Liquid A penetrates to a deep part where the light source cannot reach, it is possible to suppress residual unreacted monomer, which is preferable.

Moreover, curing may be completed by another light source that is not driven. International patent application WO 99/54415 discloses as an irradiation method a method employing optical fiber or a method in which a collimated light source is shone on a mirror surface provided on a side face of a head unit and a recording area is irradiated with UV rays, and such a curing method can also be applied to the inkjet recording method of the present invention.

By employing the above-mentioned inkjet recording method, it is possible to keep the diameter of landed Liquid A dots constant even for various recording media having different surface wettabilities, thus improving the image quality. When obtaining a colored image, by superimposing in order from high lightness Liquid A, it becomes easy for radiation to reach Liquid A in a lower part, and good curing sensitivity, reduction of residual monomer, and improvement in adhesion can be expected. Although it is possible to carry out irradiation all at once after all colors are discharged, it is preferable in terms of promoting curing that exposure to light is carried out for each color.

<Degree of Cure>

In Step b, Liquid A is completely cured or semi-cured so that the degree of cure is at least 90%. Being completely cured means that the degree of cure as defined below is 100%.

The degree of cure of Liquid A in Step b is at least 90% but no greater than 100%. When the degree of cure is less than 90%, a cured film for forming a printed material (decorative sheet) becomes soft, and abrasion due to a mold easily occurs.

From the viewpoint of further preventing abrasion due to a mold and from the viewpoint of handling in the printing step, the degree of cure in Step b is preferably at least 95%, and it is particularly preferable for the cure to be complete (the degree of cure being 100%).

The degree of cure may be calculated by taking out a sample immediately after curing Liquid A and determining the mass of Liquid A remaining on the substrate by a transfer test that is described below.

Degree of cure (%)=(mass of Liquid $A$ remaining on substrate after transfer test)/(mass of Liquid $A$ on substrate before transfer test)×100

The transfer test is carried out using as a permeable medium plain paper (copier paper C2, product code V436, Fuji Xerox Co., Ltd.). The plain paper is pressed with a constant force (a constant force in the range of 500 to 1,000 mN/cm$^2$) against Liquid A on the non-permeable substrate that has been taken out, allowed to stand for about 1 minute, and then peeled off gently, and the mass of the plain paper before and after the transfer test is measured. The size of the substrate is A4 size, which is the same as the plain paper.

Furthermore, the mass of the substrate before application of Liquid A, the mass of the substrate after application of Liquid A, and the mass of the substrate after the transfer test are measured, and the degree of cure is determined from these measurement values.

Step c: Step of Applying Liquid B to Cured Layer of Completely Cured or Semi-Cured Liquid a The image formation method of the present invention comprises Step c: a step of applying Liquid B to a cured layer of the completely cured or semi-cured Liquid A.

Liquid B is preferably applied to the same region as the image formed on the substrate by means of Liquid A in Step a or to a wider region than that of the image, and is preferably applied so as to cover the entire face of a region on which an image can be formed. That is, it is preferably applied as a continuous single layer covering the entire surface of a region on which an image can be formed.

The application of Liquid B may be carried out by any method as long as a layer having a uniform film thickness can be formed, and is not particularly limited. Examples include a coating method, an inkjet method, a screen printing method, and an immersion method. Examples of the coating method include a bar coater, a roll coater, an extrusion die coater, an air doctor coater, a blade coater, a rod coater, a knife coater, a squeegee coater, and a reverse roll coater.

Among them, it is preferable to carry out application of Liquid B in Step c by screen printing or roll coater printing. From the viewpoint of suitability for printing with a uniform thickness (preferably, 4 to 20 µm) on a cured film of Liquid A, screen printing or roll coater printing is preferable.

The time interval between Step b and Step c is preferably no greater than 24 hours, more preferably no greater than 1 hour, and yet more preferably no greater than 10 minutes. It is preferable for the time interval between Step b and Step c to be within this range since the compatibility of Liquid B with a cured film of Liquid A is high and a uniform layer of Liquid B is formed.

The amount of Liquid B applied in Step c as a film thickness before curing is preferably 4 to 20 µm, more preferably 4 to 12 µm, and yet more preferably 4 to 10 µm. It is preferable for the amount of Liquid B applied to be within this range since the blocking resistance of an image is excellent, vacuum forming suitability is excellent and, moreover, the occurrence of abrasion due to a mold is suppressed.

Step d: Step of Completely Curing Liquid A and Liquid B

The image formation method of the present invention comprises (Step d) a step of completely curing Liquid A and Liquid B. Liquid A is preferably completely cured in Step b, and in this case only Liquid B is completely cured in Step d, and such a mode is also naturally included in the present invention.

Curing in Step d is the same as in the curing step in Step b, and a preferred range is also the same.

In Step d, Liquid A and Liquid B are completely cured. That is, irradiation with actinic radiation is carried out so that the degree of cure is 100% in the transfer test.

The time interval between Step c and Step d is preferably no greater than 10 seconds. It is more preferably no greater than 5 seconds, yet more preferably no greater than 3 seconds, and particularly preferably the interval between Step c and Step d is as short as possible.

It is preferable for the interval between Step c and Step d to be within this range since penetration of a monomer component (Component A, Component B, etc.) of Liquid B into a cured film of Liquid A is suppressed, softening of the entire cured film of an image is suppressed, and the occurrence of abrasion due to a mold is thereby suppressed.

In order to shorten the time interval between Step c and Step d as much as possible, it is preferable to use a device (equipment) in which a printer (applicator) of Step c and an actinic radiation irradiation device of Step d are integrated.

2. Liquid A and Liquid B

Liquid A and Liquid B used in the image formation method of the present invention are now explained.

Liquid A and Liquid B used in the present invention are radiation-curable compositions, and preferably oil-based compositions. Liquid A and Liquid B preferably do not contain water or a volatile solvent if possible, and even if they are contained, the content of each is preferably no greater than 5 mass % of the total mass of the composition, more preferably no greater than 1 mass %, and yet more preferably no greater than 0.5 mass %.

(Liquid A)

Liquid A used in the present invention comprises N-vinylcaprolactam as Component A, an aromatic ring-containing monofunctional acrylate as Component B, an aliphatic hydrocarbon ring-containing monofunctional acrylate as Component C, a polysiloxane compound as Component D, an acrylic resin having a glass transition temperature of 40° C. to 90° C. as Component E, a photopolymerization initiator as Component F, and a pigment as Component G, the content of Component E in Liquid A being at least 0.5 mass % but no greater than 5 mass %.

Due to Liquid A having the above constitution, a printed material that is obtained has excellent stretchability and is also excellent in terms of storage stability, substrate adhesion, and trimming suitability.

Since it is preferable for Liquid A to be applied to a substrate by inkjet printing in Step a, the viscosity of Liquid A at room temperature (25° C.) is preferably 5 to 50 mPa·s, more preferably 5 to 40 mPa·s, and yet more preferably 10 to 30 mPa·s.

As a specific method for measuring viscosity, for example, it may be measured using a model RE80 viscometer (Toki Sangyo Co., Ltd.) after rotating a rotor at a liquid temperature of 25° C. for 2 minutes and stabilizing.

Liquid A comprises a monofunctional polymerizable compound; it preferably comprises a monofunctional polymerizable monomer in an amount of at least 95 mass % of the entire polymerizable compound, and more preferably at least 98 mass %. When the content of the monofunctional polymerizable compound is within this range, molding suitability, in particular stretchability, is excellent.

(Liquid B)

The Liquid B used in the present invention comprises N-vinylcaprolactam as Component A, an aromatic ring-containing monofunctional acrylate as Component B, a polysiloxane compound as Component D, a thermoplastic resin having a glass transition temperature of 70° C. to 110° C. as Component H, and a photopolymerization initiator as Component F, the content of Component H in Liquid B being at least 20 mass % but no greater than 50 mass %.

Due to Liquid B having the above constitution, a printed material having excellent storage stability and excellent substrate adhesion can be obtained, release properties from a mold at the time of a molding operation such as vacuum forming are excellent and, furthermore, abrasion due to the mold is suppressed.

Since it is preferable for Liquid B to be applied by roll coating or screen printing in Step c, the viscosity of Liquid B at room temperature (25° C.) is preferably 30 to 5,000 mPa·s, more preferably 50 to 2,000 mPa·s, and yet more preferably 50 to 1,000 mPa·s.

In the present invention, Liquid B may comprise (Component G) a pigment, which is described later, preferably comprises a white pigment or does not comprise a pigment, and more preferably does not comprise a pigment. Addition of a small amount of pigment or dye for the purpose of adjusting the hue of Liquid B is not excluded; for example, a very small amount (specifically no greater than 1 mass %) of a blue colorant may be added to thus suppress a yellow tinge due to discoloration.

Each of the components forming Liquid A and/or Liquid B and preferred modes thereof are explained below.

Component A: N-vinylcaprolactam

In the present invention, Liquid A and Liquid B comprise N-vinylcaprolactam as Component A. By comprising Component A, they have excellent curability and excellent adhesion to a substrate such as a polycarbonate (PC), a polystyrene (PS), a polyethylene terephthalate (PET), or an acrylic substrate which is generally used in a vacuum forming, etc. Furthermore, the obtained printed material has an excellent blocking resistance. N-vinylcaprolactam is a compound having a structure below.

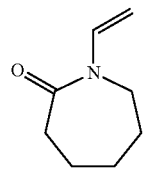

In the present invention, Liquid A preferably comprises Component A in an amount of 5 to 40 mass % relative to the total mass of Liquid A, and more preferably 10 to 30 mass %.

Liquid B preferably comprises Component A in an amount of 5 to 30 mass % relative to the total mass of Liquid B, and more preferably 10 to 25 mass %.

When the contents of Component A are within these ranges, storage stability and curability are excellent, and a cured film that is obtained has excellent strength.

Component B: Aromatic Ring-Containing Monofunctional Acrylate

In the present invention, Liquid A and Liquid B comprise an aromatic ring-containing monofunctional acrylate as Component B. When they comprise Component B, the trimming suitability is excellent. Furthermore, when Component A and Component B are used in combination, the curability is excellent.

The aromatic ring of Component B may be monocyclic or polycyclic, and there may be only one aromatic ring or there may be two or more aromatic rings.

The aromatic ring-containing monofunctional acrylate is not particularly limited as long as it is a compound having at least one aromatic ring and one acrylate group, and is preferably a compound represented by Formula B-1 below.

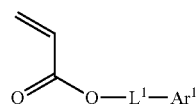

(B-1)

In Formula B-1, $Ar^1$ denotes an aromatic group, and $L^1$ denotes a single bond, an alkylene group, an alkyleneoxy group, or a polyalkyleneoxy group.

Preferable examples of the aromatic group denoted by $Ar^1$ include a phenyl group, which is a monocyclic aromatic group, or a polycyclic aromatic group having 2 to 4 rings. Specific examples of the polycyclic aromatic group include a naphthyl group, an anthryl group, a 1H-indenyl group, a 9H-fluorenyl group, a 1H-phenalenyl group, a phenanthrenyl group, a triphenylenyl group, a pyrenyl group, a naphthacenyl group, a tetraphenylenyl group, a biphenylenyl group, an as-indacenyl group, an s-indacenyl group, an acenaphthylenyl group, a fluoranthenyl group, an acephenanthrenyl group, an aceanthrenyl group, a chrysenyl group, and a pleiadenyl group.

Among them, the phenyl group is preferable.

The aromatic group may have one or more substituents such as a halogen atom, a hydroxyl group, an amino group, a thiol group, a siloxane group, or a hydrocarbon group having no greater than 30 carbons. Two or more substituents of the aromatic group may form a ring structure containing a heteroatom such as O, N, or S as in, for example, phthalic anhydride or phthalimide.

$L^1$ is preferably a single bond, an alkyleneoxy group, a polyalkyleneoxy group, and more preferably a single bond or an alkyleneoxy group, and particularly preferably an ethyleneoxy group.

Specific preferred examples of Component B include 2-phenoxyethyl acrylate, benzyl acrylate, an ethylene oxide (EO)-modified phenol acrylate, an EO-modified nonylphenol acrylate, an EO-modified cresol acrylate, a propylene oxide (PO)-modified phenol acrylate, a PO-modified nonylphenol acrylate, a PO-modified cresol acrylate, phenyl acrylate, and naphthyl acrylate, and more preferred examples include 2-phenoxyethyl acrylate, benzyl acrylate, an EO-modified phenol acrylate, and an EO-modified nonylphenol acrylate.

Among them, because of low odor, low viscosity, and excellent inkjet suitability, 2-phenoxyethyl acrylate is particularly preferable.

With regard to Component B, one type may be used on its own or two or more types may be used in combination.

The content of Component B in Liquid A is preferably 5 to 70 mass % relative to the total mass of Liquid A, more preferably 7 to 50 mass %, and yet more preferably 10 to 30 mass %.

The content of Component B in Liquid B is preferably 1 to 70 mass % relative to the total mass of Liquid B, more preferably 5 to 40 mass %, and yet more preferably 10 to 30 mass %.

When the content of Component B is within these ranges, the storage stability is excellent, and a printed material that is obtained is excellent in terms of adhesion, blocking resistance, and trimming suitability.

Component C: Aliphatic Hydrocarbon Ring-Containing Monofunctional Acrylate

In the present invention, Liquid A comprises an aliphatic hydrocarbon ring-containing monofunctional acrylate as Component C. Due to it comprising Component C, a printed material that is obtained has excellent blocking resistance. Furthermore, prevention of abrasion due to a mold is excellent, and a printed material having excellent release properties from a mold can be obtained. Moreover, due to the combined use of Component A, Component B, and Component C, the curability is excellent.

In the present invention, Liquid B comprising Component C is not excluded; Liquid B may comprise Component C, and it is preferable for Liquid B also to comprise Component C. Due to Liquid B comprising Component C, a cured film having excellent stretchability can be obtained.

The aliphatic hydrocarbon ring of Component C may be monocyclic or it may be a polycyclic ring such as a fused ring or a bridged ring, and there may be only one aliphatic ring or there may be two or more aliphatic rings.

The aliphatic hydrocarbon ring-containing monofunctional acrylate is not particularly limited as long as it is a compound having at least one aliphatic hydrocarbon ring and one acrylate group, and it is preferably a compound represented by Formula C-1 below.

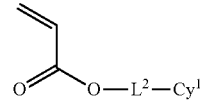

(C-1)

In Formula C-1, $Cy^1$ denotes an aliphatic hydrocarbon ring group, and $L^2$ denotes a single bond, an alkylene group, an alkyleneoxy group, or a polyalkyleneoxy group.

The aliphatic hydrocarbon ring group in $Cy^1$ is not particularly limited and may be monocyclic or it may be a polycyclic ring group such as a fused ring or a bridged ring. $Cy^1$ is preferably 3 to 36 carbons, more preferably 5 to 24 carbons, and yet more preferably 6 to 18 carbons. The number of carbons means the overall number of carbons of $Cy^1$, including those of a substituent. Specific preferred examples of $Cy^1$ include a cyclohexyl group, a 3,3,5-trimethylcyclohexyl group, a 4-t-butylcyclohexyl group, an isobornyl group, a norbornyl group, a dicyclopentanyl group, a dicyclopentenyl group, and a tricyclodecanyl group.

The aliphatic hydrocarbon ring group may have one or more alkyl group, halogen atom, hydroxy group, amino group, thiol group, siloxane group, or substituent having no greater than 30 carbons. For example, two or more substituents of the aliphatic hydrocarbon ring group may form a cyclic structure comprising a heteroatom such as O, N, or S. Furthermore, the aliphatic hydrocarbon ring group may comprise an ethylenically unsaturated bond.

$L^2$ is preferably a single bond, an alkyleneoxy group, or a polyalkyleneoxy group, more preferably a single bond or an alkyleneoxy group, and particularly preferably a single bond.

Specific preferred examples of Component C include 3,3,5-trimethylcyclohexyl acrylate, 4-t-butylcyclohexyl acrylate, isobornyl acrylate, norbornyl acrylate, cyclohexyl acrylate, cyclopentyl acrylate, cycloheptyl acrylate, cyclooctyl acrylate, cyclodecyl acrylate, dicyclodecyl acrylate, dicyclopentanyloxyethyl acrylate, and dicyclopentenyloxyethyl acrylate, more preferred examples include 3,3,5-trimethylcyclohexyl acrylate, 4-t-butylcyclohexyl acrylate, isobornyl acrylate, and cyclohexyl acrylate, and yet more preferred examples include 3,3,5-trimethylcyclohexyl acrylate, 4-t-butylcyclohexyl acrylate, and isobornyl acrylate.

Among them, from the viewpoint of low odor, low viscosity, inkjet suitability, and trimming suitability, Component C in Liquid A is particularly preferably t-butylcyclohexyl acrylate or 3,3,5-trimethylcyclohexyl acrylate, and from the viewpoint of achieving a balance between blocking resistance and trimming suitability, t-butylcyclohexyl acrylate is most preferable.

Furthermore, when Liquid B comprises Component C, preferred examples include 3,3,5-trimethylcyclohexyl acrylate, 4-t-butylcyclohexyl acrylate, isobornyl acrylate, and cyclohexyl acrylate, more preferred example include 3,3,5-trimethylcyclohexyl acrylate, 4-t-butylcyclohexyl acrylate, and isobornyl acrylate, and yet more preferred examples include isobornyl acrylate.

With regard to Component C, one type may be used on its own or two or more types may be used in combination.

The content of Component C is preferably 10 to 50 mass % relative to the total mass of Liquid A, more preferably 20 to 50 mass %, and yet more preferably 35 to 45 mass %. When in this range, a printed material that is obtained is excellent in terms of blocking resistance and prevention of abrasion due to a mold.

Furthermore, when Liquid B comprises Component C, the content of Component C in Liquid B is preferably 5 to 70 mass % relative to the total mass of Liquid B, more preferably 7 to 50 mass %, and yet more preferably 10 to 30 mass %.

Component D: Polysiloxane Compound

In the present invention, Liquid A and Liquid B comprise a polysiloxane compound as Component D. Due to them comprising Component D, a printed material that is obtained is excellent in terms of blocking resistance and molding suitability.

From the viewpoint of enhancing its solubility in Liquid A and Liquid B and from the viewpoint of preventing abrasion due to a mold, Component D is preferably a compound having a (meth)acrylate group, a polyether moiety, and a polysiloxane moiety. Furthermore, it is preferably a compound having a molecular weight of at least 500, and yet more preferably a compound having a molecular weight (weight-average molecular weight) of at least 1,000.

From the viewpoint of curability, blocking resistance, and molding suitability, the number of (meth)acrylate groups of Component D is preferably 4 to 6.

Furthermore, the ratio by mass of the polyether moiety and the polysiloxane moiety in Component D is preferably polyether moiety:polysiloxane moiety=1:1 to 1:2 since the blocking resistance can be improved effectively.

The position of bonding of the (meth)acrylate group in Component D is not particularly limited, and may be in a main chain or in a side chain.

Furthermore, the position of polyether-modification of Component D is not particularly limited, and may be at one terminal of the main chain, both terminals thereof, or in a side chain.

The polyether moiety of Component D is preferably a polyalkyleneoxy group.

Moreover, Component D is preferably a polydimethylsiloxane compound.

As Component D, a commercial product may suitably be used, and examples include TEGO RAD 2010, 2011, 2100, 2200N, 2250, 2300, 2500, 2600, and 2700 (all manufactured by Evonik).

With regard to Component D, one type may be used on its own or two or more types may be used in combination.

The content of Component D in Liquid A is preferably 0.1 to 10 mass relative to the total mass of Liquid A, more preferably 0.5 to 5 mass %, and yet more preferably 1 to 3 mass %.

The content of Component D in Liquid B is preferably 0.1 to 10 mass % relative to the total mass of Liquid B, more preferably 0.5 to 5 mass %, and yet more preferably 1 to 3 mass %.

It is preferable for the content of Component D to be within these ranges since the blocking resistance is excellent and the molding suitability is excellent.

Component E: Acrylic Resin Having Glass Transition Temperature of 40° C. To 90° C.

In the present invention, Liquid A comprises an acrylic resin having a glass transition temperature (hereinafter, also called Tg) of 40° C. to 90° C. as Component E, the content of Component E in Liquid A being 0.5 to 5 mass % relative to the total mass of Liquid A. When it comprises Component E in this range, the inkjet discharge properties, adhesion to a substrate, and blocking resistance and molding properties of a printed material that is obtained are excellent.

The content of Component E is preferably 0.7 to 4 mass %, and yet more preferably 1 to 3 mass %.

The glass transition temperature (Tg) of Component E is 40° C. to 90° C., preferably 60° C. to 90° C., and yet more preferably 70° C. to 90° C. When in this range, the inkjet discharge properties, adhesion, and blocking resistance and prevention of abrasion due to a mold of a printed material that is obtained are excellent, and post-molding cracking at the time of trimming after molding can be further suppressed.

When the Tg of Component E is less than 40° C., the adhesion, blocking resistance, and abrasion due to a mold are degraded. Furthermore, when the Tg of Component E exceeds 90° C., inkjet discharge suitability is degraded or post-molding cracking at the time of trimming after molding easily occurs.

From the viewpoint of adhesion to a substrate, blocking resistance, and inkjet discharge suitability, the weight-average molecular weight of Component E is preferably 3,000 to 100,000, more preferably 3,000 to 80,000, and yet more preferably 3,000 to 50,000.

Although it is not a serious problem for a printed material that will not be subjected to molding, when a printed material that is obtained by the image formation method of the present invention is suitably subjected to molding, preferably vacuum forming, pressure forming, or vacuum/pressure forming, and yet more preferably vacuum forming, from the viewpoint of preventing the phenomenon of the gaps between dots increasing due to stretching, and a decrease in density becoming prominent, that is, whitening during molding, the weight-average molecular weight of Component E is particularly preferably 5,000 to 50,000.

The molecular weight, such as the weight-average molecular weight (Mw) or the number-average molecular weight (Mn), of a polymer compound in the present invention is a measured value that is obtained by actual measurement. Specifically, a polymer molecular weight means a value measured using high performance liquid chromatography under usual measurement conditions.

Specifically, it is measured by a GPC method (gel permeation chromatograph method) and converted using reference polystyrene. For example, an HLC-8220 GPC (Tosoh Corporation) is used as the GPC, with three columns of TSKgeL SuperHZM-H, TSKgeL SuperHZ4000, and TSKgeL SuperHZ2000 (Tosoh Corporation, 4.6 mm ID×15 cm) as columns, and THF (tetrahydrofuran) as eluent. The conditions are such that the sample concentration is 0.35 mass %, the flow rate is 0.35 mL/min, the amount of sample injected is 10 μL, the measurement temperature is 40° C., and an IR detector is used. Furthermore, a calibration curve is generated from eight samples of 'reference sample TSK standard, polystyrene', that is, 'F-40', 'F-20', 'F-4', 'F-1', 'A-5000', 'A-2500', 'A-1000', and 'n-propylbenzene' manufactured by Tosoh Corporation Furthermore, the glass transition temperature (Tg) of a polymer compound in the present invention is a measured Tg that is obtained by actual measurement. Specifically, a measured Tg may be a value measured using an EXSTAR 6220 differential scanning calorimeter (DSC) manufactured by SII Nanotechnology Inc. under usual measurement conditions.

When measurement is difficult due to decomposition, etc. of a polymer, a calculated Tg obtained by the calculation equation below may be used. The calculated Tg is calculated using Equation (T) below.

$$1/Tg = \Sigma(Xi/Tgi) \tag{T}$$

Here, i=1 to n, and a polymer for which the calculation is to be employed is assumed to be a copolymer of n types of monomer components. Xi is the mass fraction ($\Sigma Xi=1$) of the ith monomer, and Tgi is the glass transition temperature (absolute temperature) of a homopolymer of the ith monomer (Tgi) is referred to in the Polymer Handbook (3rd Edition) (J. Brandrup, E. H. Immergut (Wiley-Interscience, 1989)).

Component H: Thermoplastic Resin Having Glass Transition Temperature (Tg) of 70° C. To 110° C.

In the present invention, Liquid B comprises a thermoplastic resin having a glass transition temperature (hereinafter, also called Tg) of 70° C. to 110° C. as Component H, and the content of Component H is 20 to 50 mass % relative to the total mass of Liquid B. When it comprises Component H in this range, the prevention of abrasion due to a mold, ease of removing a printed material from a mold, and trimming suitability are excellent.

The content of Component H is preferably 20 to 40 mass %, and yet more preferably 20 to 30 mass.

The glass transition temperature (Tg) of Component H is 70° C. to 110° C., and yet more preferably 80° C. to 110° C. When in this range, the blocking resistance of a printed material that is obtained, prevention of abrasion due to a mold, and the ease of removing a printed material from a mold are excellent.

Furthermore, when the Tg of Component H is less than 70° C., the blocking resistance, prevention of abrasion due to a mold, and ease of removing a printed material from a mold are degraded. When the Tg of Component H exceeds 110° C., dissolution becomes harder, production requires a longer time, and post-molding cracking at the time of trimming after vacuum forming easily occurs.

From the viewpoint of blocking resistance, prevention of abrasion due to a mold, and ease of removing a printed material from a mold, the weight-average molecular weight of Component H is preferably 10,000 to 200,000, more preferably 20,000 to 200,000, and yet more preferably 20,000 to 100,000.

Examples of the thermoplastic resin of Component H include an acrylic resin, a vinyl resin, a polyester resin, and a polyamide resin, but from the viewpoint of ease of control of desirable physical properties, commercial availability, and low cost, an acrylic resin and a vinyl resin can suitably be used. Furthermore, when solubility in Component A and Component B, which are the main components of Liquid B, is considered, an acrylic resin is particularly suitable.

As Component E and Component H, specifically a homopolymer or copolymer of a (meth)acrylate compound may suitably be used. From the viewpoint of ease of control of Tg, good compatibility with Liquid A or Liquid B, and low cost, a homopolymer or copolymer of a monofunctional (meth)acrylate compound is preferable, a copolymer of two or more types of monofunctional (meth)acrylate compounds is more preferable, and a copolymer of methyl methacrylate and a monofunctional (meth)acrylate compound is yet more preferable.

Furthermore, Component E is preferably an inactive acrylic resin. The 'inactive acrylic resin' in the present invention means the acrylic resin being a polymer that does not have a polymerizable functional group that can undergo a further chain-growth polymerization reaction and that does not have a crosslinkable and/or crosslinking functional group that can undergo a further successive crosslinking reaction. That is, it means an acrylic resin in a state in which a polymerization reaction and a crosslinking reaction do not substantially occur.

Examples of the (meth)acrylate compound as a starting material for the synthesis of Component E and Component H include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, isopentyl (meth)acrylate, t-pentyl (meth)acrylate, neopentyl (meth)acrylate, 1-naphthyl (meth)acrylate, 2-naphthyl (meth)acrylate, 2-α-naphthoxyethyl (meth)acrylate, 2-β-naphthoxyethyl (meth)acrylate, 2-anthryl (meth)acrylate, 9-anthryl (meth)acrylate, 1-phenanthryl (meth)acrylate, 2-phenanthryl (meth)acrylate, an ethylene oxide-modified cresol (meth)acrylate, p-nonylphenoxyethyl (meth)acrylate, p-nonylphenoxypolyethylene glycol (meth)acrylate, p-cumylphenoxyethylene glycol (meth)acrylate, 2-furyl (meth)acrylate, 2-furfuryl (meth)acrylate, 2-thienyl (meth)acrylate, 2-thenyl (meth)acrylate, 1-pyrrolyl (meth)acrylate, 2-pyridyl (meth)acrylate, 2-quinolyl (meth)acrylate, norbornyl (meth)acrylate, isobornyl (meth)acrylate, cyclohexyl (meth)acrylate, cyclopentyl (meth)acrylate, cycloheptyl (meth)acrylate, cyclooctyl (meth)acrylate, cyclodecyl (meth)acrylate, dicyclodecyl (meth)acrylate, 3,3,5-trimethylcyclohexyl (meth)acrylate, 4-t-butylcyclohexyl (meth)acrylate, acryloylmorpholine, N-phthalimidoethyl (meth)acrylate, pentamethylpiperidyl (meth)acrylate, tetramethylpiperidyl (meth)acrylate, 5-(meth)acryloyloxymethyl-5-ethyl-1,3-dioxacyclohexane, 2-ethylhexyl (meth)acrylate, 2-hydroxyethyl (meth)acrylate, butoxyethyl (meth)acrylate, carbitol (meth)acrylate, n-butyl (meth)acrylate, allyl (meth)acrylate, glycidyl (meth)acrylate, dimethylaminomethyl (meth)acrylate, and oligoester (meth)acrylate.

Component E is preferably a homopolymer or copolymer of a methacrylate compound.

From the viewpoint of ease of control of Tg, good compatibility with Liquid A, and low cost, Component E is preferably a copolymer of two or more types of methacrylic compounds selected from the group consisting of methyl methacrylate, n-butyl methacrylate, phenoxyethyl methacrylate, tetrahydrofurfuryl methacrylate, 2-ethylhexyl methacrylate, isodecyl methacrylate, methoxypolyethylene glycol methacrylate, n-lauryl methacrylate, cyclohexyl methacrylate, and t-butyl methacrylate, more preferably a copolymer of methyl methacrylate and a methacrylic compound selected from the group consisting of n-butyl methacrylate, t-butyl methacrylate, phenoxyethyl methacrylate, tetrahydrofurfuryl methacrylate, 2-ethylhexyl methacrylate, isodecyl methacrylate, methoxypolyethylene glycol methacrylate, and n-lauryl methacrylate, and yet more preferably a copolymer of methyl methacrylate and n-butyl methacrylate or t-butyl methacrylate.

With regard to Component E, one type may be used on its own or two or more types may be used in combination.

Component H is preferably a homopolymer or copolymer of a methacrylate compound.

From the viewpoint of ease of control of Tg, good compatibility with Liquid B, and low cost, Component H is preferably a homopolymer of methyl methacrylate or a copolymer of two or more types of methacrylic compounds selected from the group consisting of methyl methacrylate, n-butyl methacrylate, phenoxyethyl methacrylate, tetrahydrofurfuryl methacrylate, 2-ethylhexyl methacrylate, isodecyl methacrylate, methoxypolyethylene glycol methacrylate, n-lauryl methacrylate, cyclohexyl methacrylate, and t-butyl methacrylate, more preferably a homopolymer of methyl methacrylate or a copolymer of methyl methacrylate and a methacrylic compound selected from the group consisting of n-butyl methacrylate, t-butyl methacrylate, phenoxyethyl methacrylate, tetrahydrofurfuryl methacrylate, 2-ethylhexyl methacrylate, isodecyl methacrylate, methoxypolyethylene glycol methacrylate, and n-lauryl methacrylate, and yet more preferably a homopolymer of methyl methacrylate or a copolymer of methyl methacrylate and n-butyl methacrylate or t-butyl methacrylate.

With regard to Component H, one type may be used on its own or two or more types may be used in combination.

Component G: Pigment

In the present invention, Liquid A comprises a pigment as Component G in order to improve the visibility of an image area that is formed. Liquid B preferably comprises a white pigment or does not comprise a pigment, and more preferably does not comprise a pigment.

The pigment that can be used in the present invention is not particularly limited and may be freely chosen from known pigments and used.

From the viewpoint of preventing the sensitivity of a curing reaction due to actinic radiation from being lowered, it is preferable to select as the pigment a compound that does not function as a polymerization inhibitor in a polymerization reaction, that is, the curing reaction.

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36;

as a blue or cyan pigment, Pigment Blue 1, 15, 15:1, 15:2, 15:3, 15:4, 15:6, 16, 17-1, 22, 27, 28, 29, 36, or 60;

as a green pigment, Pigment Green 7, 26, 36, or 50;

as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193;

as a black pigment, Pigment Black 7, 28, or 26;

as a white pigment, Pigment White 6, 18, or 21, etc. may be used according to the intended application.

It is preferable that the pigment which can be used in the present invention is added to Liquid A or Liquid B and then dispersed in the ink to an appropriate degree. For dispersion of the pigment, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The pigment may be added directly to Liquid A or Liquid B, but in order to improve dispersibility it may be added in advance to a solvent or a dispersing medium like a polymerizable compound such as Component A to Component C, etc. used in Liquid A.

In the present invention, in order to avoid the problem of the solvent resistance being degraded when the solvent remains in the cured image and the VOC (Volatile Organic Compound) problem of the residual solvent, it is preferable to add the pigment in advance to a dispersing medium such as a polymerizable compound. As a polymerizable compound used, it is preferable in terms of dispersion suitability to select a monomer having the low viscosity.

The pigments may be used by appropriately selecting one type or two or more types according to the intended purpose of Liquid A.

When a pigment that is present as a solid in Liquid A is used, it is preferable for the pigment, the dispersant, the dispersing medium, dispersion conditions, and filtration conditions to be set so that the average particle size of pigment particles is preferably 0.005 to 0.5 μm, more preferably 0.01 to 0.45 μm, and yet more preferably 0.015 to 0.4 μm. By such control of particle size, clogging of a head nozzle can be suppressed, and the ink storage stability, the transparency, and the curing sensitivity can be maintained.

The content of the pigment in the ink composition is appropriately selected according to the color and the intended purpose, and is preferably 0.01 to 30 mass % relative to the mass of the entire composition.

In the present invention, with regard to the ratio by mass of the dispersant relative to the pigment, when the mass of the pigment in the composition is P and the mass of the dispersant in the composition is R, the ratio by mass (R/P) is preferably $0.05 \leq R/P \leq 15$, more preferably $0.1 \leq R/P \leq 10$, and yet more preferably $0.1 \leq R/P \leq 5$. When the ratio by mass of the dispersant relative to the pigment is at least 0.5, aggregation and precipitation of the pigment during storage over time and increase in viscosity of the composition do not occur, and a composition having excellent storage stability over time can be obtained. When the ratio is no greater than 15, the viscosity of the composition is low, and a composition having excellent discharge stability can be obtained.

Component F: Photopolymerization Initiator

In the present invention, Liquid A and Liquid B each comprise a photopolymerization initiator as Component F.

As the photopolymerization initiator that can be used in the present invention, a known photopolymerization initiator may be used. With regard to the photopolymerization initiator that can be used in the present invention, one type may be used on its own or two or more types may be used in combination.

The photopolymerization initiator that can be used in the present invention is a compound that absorbs external energy due to irradiation with actinic radiation and generates an initiating species.

The photopolymerization initiator is preferably a photoradical polymerization initiator.

In the present invention, the molecular weight of the photopolymerization initiator is preferably at least 250, more preferably at least 280, and yet more preferably at least 300. When in this range, in a heating step when producing a molding, it is possible to suppress evaporation of residual low-molecular-weight initiator that contaminates by adhering to the molding itself or to surrounding equipment, and to suppress the occurrence of cloudiness, etc. of a molding.

When a photopolymerization initiator having a molecular weight of at least 250 and a photopolymerization initiator having a molecular weight of less than 250 are used in combination, the content of the photopolymerization initiator having a molecular weight of at least 250 is preferably at least 50 mass % of the total amount of photopolymerization initiator, more preferably at least 80 mass %, yet more preferably at least 90 mass %, and particularly preferably 100 mass %, that is, the photopolymerization initiator having a molecular weight of at least 250 being 100 mass % and the photopolymerization initiator having a molecular weight of less than 250 not being contained.

Examples of the radical photopolymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound. With regard to these radical photopolymerization initiators, the above-mentioned compounds (a) to (m) may be used singly or in combination. Furthermore, for example, two or more types of (a) can be used in combination. The radical polymerization initiator in the present invention may suitably be used singly or in a combination of two or more types.

Moreover, in the present invention, a radical photopolymerization initiator having a molecular weight of less than 250 can be used in combination with a radical photopolymerization initiator having a molecular weight of at least 250. In the description below, the radical photopolymerization initiator having a molecular weight of less than 250 is also described.

Preferred examples of the aromatic ketone (a) and the thio compound (e) include a compound having a benzophenone skeleton or a compound having a thioxanthone skeleton described in 'RADIATION CURING IN POLYMER SCIENCE AND TECHNOLOGY' J. P. FOUASSIER J. F. RABEK (1993), pp. 77 to 117. Preferred examples of the aromatic ketone (a), the acylphosphine compound (b) and the thio compound (e) include an α-thiobenzophenone compound described in JP-B-47-6416, a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, a thioxanthone described in JP-B-63-61950, and a coumarin described in JP-B-59-42864.

Examples of the benzophenone compound include benzophenone (Mw: 182.2), 4-phenylbenzophenone (Mw: 258), isophthalophenone (Mw: 286), 4,4"-diethylisophthalophenone (Mw: 342), and 4-benzoyl-4'-methylphenylsulfide (Mw: 268). Examples of the thioxanthone compound include 2,4-diethylthioxanthone (Mw: 268), 2-isopropylthioxanthone (Mw: 254), and 2-chlorothioxanthone (Mw: 248).

Furthermore, as the aromatic ketone (a), an α-hydroxyketone compound (including an α-hydroxyalkylphenone compound), an α-aminoketone compound (including an α-aminoalkylphenone compound), and a ketal compound are preferable. Specific examples include 2-hydroxy-1-{4-[4-(2-hydroxy-2-methylpropionyl)benzyl]phenyl}-2-methyl-propan-1-one (Mw: 340.4), 2-methyl-1-[4-(methylthio)phenyl]-2-morpholinopropan-1-one (Mw: 279.4), 2-benzyl-2-dimethylamino-1-(4-morpholinophenyl)butanone-1 (Mw: 366.5), 2,2-dimethoxy-1,2-diphenylethan-1-one (Mw: 256.3), 1-[4-(2-hydroxyethoxyl)phenyl]-2-hydroxy-2-methyl-1-propan-1-one (IRGACURE 2959, Mw: 224.3), 2-hydroxy-2-methyl-1-phenylpropan-1-one (DAROCURE 1173, Mw: 164), 1-hydroxycyclohexyl phenyl ketone (Mw: 204), and 2,2-dimethoxy-1,2-diphenylethane.

In the present invention, the acylphosphine compound (b) is preferably an acylphosphine oxide compound.

Examples of the acylphosphine oxide compound include a compound having a structure represented by Formula (7) or (8).

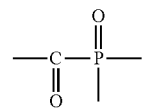

Formula (7)

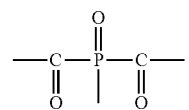

Formula (8)

The acylphosphine oxide compound is particularly preferably one having a chemical structure represented by Formula (9) or (10).

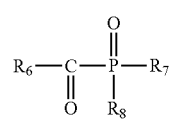

Formula (9)

(In the formula, $R_6$, $R_7$, and $R_8$ denote an aromatic hydrocarbon group, which may have a methyl group or an ethyl group as a substituent.)

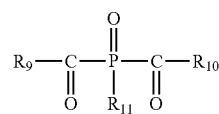

Formula (10)

(In the formula, $R_9$, $R_{10}$, and $R_{11}$ denote an aromatic hydrocarbon group, which may have a methyl group or an ethyl group as a substituent.)

As the acylphosphine oxide compound, a monoacylphosphine oxide compound, a bisacylphosphine oxide compound, etc. may be used, and as the monoacylphosphine oxide compound, a known monoacylphosphine oxide compound may be used. Examples thereof include monoacylphosphine oxide compounds described in JP-B-60-8047 and JP-B-63-40799.

Specific examples thereof include methyl isobutyrylmethylphosphinate (Mw: 164.1), methyl isobutyrylphenylphosphinate (Mw: 226.2), methyl pivaloylphenylphosphinate (Mw: 240.2), methyl 2-ethylhexanoylphenylphosphinate (Mw: 270.3), isopropyl pivaloylphenylphosphinate (Mw: 268.3), methyl p-tolylphenylphosphinate (Mw: 274.3), methyl o-tolylphenylphosphinate (Mw: 274.3), methyl 2,4-dimethylbenzoylphenylphosphinate (Mw: 288.3), isopropyl p-t-butylbenzoylphenylphosphinate (Mw: 344.4), isobutyryldiphenylphosphine oxide (Mw: 272.3), 2-ethylhexanoyldiphenylphosphine oxide (Mw: 328.4), o-tolyldiphenylphosphine oxide (Mw: 320.3), p-t-butylbenzoyldiphenylphosphine oxide (Mw: 350.4), 3-pyridylcarbonyldiphenylphosphine oxide (Mw: 307.3), benzoyldiphenylphosphine oxide (Mw: 306.3), vinyl pivaloylphenylphosphinate (Mw: 236.3), adipoyl-bis-diphenylphosphine oxide (Mw: 514.5), pivaloyldiphenylphosphine oxide (Mw: 286.3), p-tolyldiphenylphosphine oxide (Mw: 320.), 4-(t-butyl)benzoyldiphenylphosphine oxide (Mw: 362.4), terephthaloyl-bis-diphenylphosphine oxide (Mw: 534.5), 2-methylbenzoyldiphenylphosphine oxide (Mw: 320.3), 2-methyl-2-ethylhexanoyldiphenylphosphine oxide (Mw: 342.4.2), 1-methylcyclohexanoyldiphenylphosphine oxide (Mw: 326.4), and 2,4,6-trimethylbenzoyldiphenylphosphine oxide (Mw: 618.8).

As the bisacylphosphine oxide compound, a known bisacylphosphine oxide compound may be used. Examples thereof include bisacylphosphine oxide compounds described in JP-A-3-101686, JP-A-5-345790, and JP-A-6-298818.

Specific examples thereof include bis(2,6-dichlorobenzoyl)phenylphosphine oxide (Mw: 472.1), bis(2,6-dichlorobenzoyl)-2,5-dimethylphenylphosphine oxide (Mw: 500.1), bis(2,6-dichlorobenzoyl)-4-ethoxyphenylphosphine oxide (Mw: 516.1), bis(2,6-dichlorobenzoyl)-4-propylphenylphosphine oxide (Mw: 514.2), bis(2,6-dichlorobenzoyl)-2-naphthylphosphine oxide (Mw: 522.2), bis(2,6-dichlorobenzoyl)-1-naphthylphosphine oxide (Mw: 522.2), bis(2,6-dichlorobenzoyl)-4-chlorophenylphosphine oxide (Mw: 506.5), bis(2,6-dichlorobenzoyl)-2,4-dimethoxyphenylphosphine oxide (Mw: 532.1), bis(2,6-dichlorobenzoyl)decylphosphine oxide (Mw: 536.3), bis(2,6-dichlorobenzoyl)-4-octylphenylphosphine oxide (Mw: 584.3), bis(2,4,6-trimethylbenzoyl)phenylphosphine oxide (Mw: 418.5), bis(2,4,6-trimethylbenzoyl)-2,5-dimethylphenylphosphine oxide (Mw: 446.5), bis(2,6-dichloro-3,4,5-trimethoxybenzoyl)-2,5-dimethylphenylphosphine oxide (Mw: 632.3), bis(2,6-dichloro-3,4,5-trimethoxybenzoyl)-4-ethoxyphenylphosphine oxide (Mw: 696.3), bis(2-methyl-1-naphthoyl)-2,5-dimethylphenylphosphine oxide (Mw: 490.5), bis(2-methyl-1-naphthoyl)-4-ethoxyphenylphosphine oxide (Mw: 506.5), bis(2-methyl-1-naphthoyl)-2-naphthylphosphine oxide (Mw: 512.5), bis(2-methyl-1-naphthoyl)-4-propylphenylphosphine oxide (Mw: 504.6), bis(2-methyl-1-naphthoyl)-2,5-dimethylphenylphosphine oxide (Mw: 490.5), bis(2-methoxy-1-naphthoyl)-4-ethoxyphenylphosphine oxide (Mw: 506.5), bis(2-chloro-1-naphthoyl)-2,5-dimethylphenylphosphine oxide (Mw: 531.4), and bis(2,6-dimethoxybenzoyl)-2,4,4-trimethylpentylphosphine oxide (Mw: 426.5).

Among them, preferred examples of the acylphosphine oxide compound in the present invention include bis(2,4,6-trimethylbenzoyl)phenylphosphine oxide (IRGACURE 819: manufactured by BASF, Mw: 418.5), bis(2,6-dimethoxybenzoyl)-2,4,4-trimethylpentylphenylphosphine oxide (Mw: 426.5), and 2,4,6-trimethylbenzoyldiphenylphosphine oxide (Darocur TPO: manufactured by Ciba Specialty Chemicals, Lucirin TPO: manufactured by BASF, Mw: 348.4).

As the aromatic onium salt compound (c), there can be cited aromatic onium salts of elements of Groups 15, 16, and 17 of the periodic table, specifically, N, P, As, Sb, Bi, O, S, Se, Te, and I. Examples thereof include iodonium salts described in EP No. 104143, U.S. Pat. No. 4,837,124, JP-A-2-150848, and JP-A-2-96514, diazonium salts (optionally substituted benzenediazoniums, etc.) described in EP Nos. 370693, 233567, 297443, 297442, 279210, and 422570, U.S. Pat. Nos. 3,902,144, 4,933,377, 4,760,013, 4,734,444, and 2,833,827, diazonium salt resins (diazodiphenylamine formaldehyde resins, etc.), N-alkoxypyridinium salts, etc. (e.g. those described in U.S. Pat. No. 4,743,528, JP-A-63-138345, JP-A-63-142345, JP-A-63-142346, and JP-B-46-42363; specific examples thereof include 1-methoxy-4-phenylpyridinium tetrafluoroborate, etc.); furthermore, compounds described in JP-B-52-147277, 52-14278, and 52-14279 may suitably be used. A radical or an acid is formed as an active species.

As the organic peroxide (d), almost all organic compounds having at least one oxygen-oxygen bond per molecule can be cited, and preferred examples thereof include peroxide ester compounds such as 3,3',4,4'-tetra(t-butylperoxycarbonyl)benzophenone (Mw: 646.7), 3,3',4,4'-tetra(t-amylperoxycarbonyl)benzophenone (Mw: 702.8), 3,3',4,4'-tetra(t-hexylperoxycarbonyl)benzophenone (Mw: 758.9), 3,3',4,4'-tetra(t-octylperoxycarbonyl)benzophenone (Mw: 823.1), 3,3',4,4'-tetra(cumylperoxycarbonyl)benzophenone (Mw: 895.0), 3,3',4,4'-tetra(p-isopropylcumylperoxycarbonyl)benzophenone (Mw: 1063.3), and di-t-butyldiperoxyisophthalate (Mw: 310.3).

As the hexaarylbiimidazole compound (f), there can be cited lophine dimers described in JP-B-45-37377 and JP-B-44-86516, and examples thereof include 2,2'-bis(o-chlorophenyl)-4,4',5,5'-tetraphenylbiimidazole (Mw: 659.6), 2,2'-bis(o-bromophenyl)-4,4',5,5'-tetraphenylbiimidazole (Mw: 748.5), 2,2'-bis(o,p-dichlorophenyl)-4,4',5,5'-tetraphenylbiimidazole (Mw: 732.5), 2,2'-bis(o-chlorophenyl)-4,4',5,5'-tetra(m-methoxyphenyl)biimidazole (Mw: 779.7), 2,2'-bis(o,o'-dichlorophenyl)-4,4',5,5'-tetraphenylbiimidazole (Mw: 728.5), 2,2'-bis(o-nitrophenyl)-4,4',5,5'-tetraphenylbiimidazole (Mw: 648.7), and 2,2'-bis(o-methylphenyl)-4,4',5,5'-tetraphenylbiimidazole (Mw: 618.8).

As the ketoxime ester compound (g), there can be cited 3-benzoyloxyiminobutan-2-one (Mw: 205.2), 3-acetoxyiminobutan-2-one (Mw: 143.1), 3-propionyloxyiminobutan-2-one (Mw: 157.2), 2-acetoxyiminopentan-3-one (Mw: 157.2), 2-acetoxyimino-1-phenylpropan-1-one (Mw: 205.2), 2-benzoyloxyimino-1-phenylpropan-1-one (Mw: 267.3), 3-p-toluenesulfonyloxyiminobutan-2-one (Mw: 255.3), and 2-ethoxycarbonyloxyimino-1-phenylpropan-1-one (Mw: 235.2).

Examples of the borate compound (h) include compounds described in U.S. Pat. Nos. 3,567,453 and 4,343,891, and EP Nos. 109,772 and 109,773.

Examples of the azinium salt compound (i) include N—O bond-containing compounds described in JP-A-63-138345, JP-A-63-142345, JP-A-63-142346, JP-A-63-143537, and JP-B-46-42363.

Examples of the metallocene compound (j) include titanocene compounds described in JP-A-59-152396, JP-A-61-151197, JP-A-63-41484, JP-A-2-249, and JP-A-2-4705, and iron-arene complexes described JP-A-1-304453 and JP-A-1-152109.

Specific examples of the titanocene compound include dicyclopentadienyl-Ti-dichloride (Mw: 249.0), dicyclopentadienyl-Ti-bis-phenyl (Mw: 332.3), di-cyclopentadienyl-Ti-bis-2,3,4,5,6-pentafluorophen-1-yl (Mw: 512.2), dicyclopentadienyl-Ti-bis-2,3,5,6-tetrafluorophen-1-yl (Mw: 476.2), dicyclopentadienyl-Ti-bis-2,4,6-trifluorophen-1-yl (Mw: 440.2), dicyclopentadienyl-Ti-2,6-difluorophen-1-yl (Mw: 404.2), dicyclopentadienyl-Ti-bis-2,4-difluorophen-1- yl (Mw: 404.2), dimethylcyclopentadienyl-Ti-bis-2,3,4,5,6-pentafluorophen-1-yl (Mw: 534.2), dimethylcyclopentadienyl-Ti-bis-2,3,5,6-tetrafluorophen-1-yl (Mw: 498.2), dimethylcyclopentadienyl-Ti-bis-2,4-difluorophen-1-yl (Mw: 426.2), bis(cyclopentadienyl)-bis(2,6-difluoro-3-(pyrr-1-yl)phenyl)titanium (Mw: 534.4), and bis(cyclopentadienyl)bis[2,6-difluoro-3-(methylsulfonamido)phenyl]titanium (Mw: 614.5).

Examples of the active ester compound (k) include nitrobenzyl ester compounds described in EP Nos. 0290750, 046083, 156153, 271851, and 0388343, U.S. Pat. Nos. 3,901,710 and 4,181,531, JP-A-60-198538, and JP-A-53-133022, iminosulfonate compounds described in EP Nos. 0199672, 84515, 199672, 044115, and 0101122, U.S. Pat. Nos. 4,618,564, 4,371,605, and 4,431,774, JP-A-64-18143, JP-A-2-245756, and JP-A-4-365048, and compounds described in JP-B-62-6223, JP-B-63-14340, and JP-A-59-174831.

Preferred examples of the compound (I) having a carbon-halogen bond include a compound described in Wakabayashi et. al, Bull. Chem. Soc. Japan, 42, 2924 (1969), a compound described in British Patent No. 1388492, a compound described in JP-A-53-133428, and a compound described in German Patent No. 3337024.

Examples further include a compound described in F. C. Schaefer et al., J. Org. Chem., 29, 1527 (1964), a compound described in JP-A-62-58241, a compound described in JP-A-5-281728, a compound described in German Pat. No. 2641100, a compound described in German Pat. No. 3333450, compounds described in German Pat. No. 3021590, and compounds described in German Pat. No. 3021599.

Among (a) to (m) above, a polymerization initiator having a molecular weight of at least 250 may suitably be used, and among (a) to (m) above any polymerization initiator having a molecular weight of less than 250 may be used in combination.

In the present invention, Liquid A and Liquid B preferably comprise at least one photopolymerization initiator selected from the group consisting of an acylphosphine oxide compound, a benzophenone compound, an α-hydroxyketone compound, an α-aminoketone compound, and a ketal compound, more preferably comprise at least one photopolymerization initiator selected from the group consisting of an acylphosphine oxide compound, an α-aminoketone compound, and an α-hydroxyketone compound, and particularly preferably comprise at least an acylphosphine oxide compound. It is also preferable to use an acylphosphine oxide compound and another polymerization initiator in combination.

Due to the above constitution, a composition having excellent curability and blocking resistance is obtained.

The content of the photopolymerization initiator is preferably 0.01 to 35 mass % relative to the total mass of polymerizable compound in the composition, more preferably 0.5 to 20 mass %, and yet more preferably 1.0 to 15 mass %. When it is at least 0.01 mass %, the composition can be sufficiently cured, and when it is no greater than 35 mass %, a cured film having a uniform degree of cure can be obtained.

When a sensitizer, which is described later, is used in the present invention, the total amount of photopolymerization initiator used is preferably 200:1 to 1:200 as a ratio by mass relative to the sensitizer, that is, photopolymerization initiator:sensitizer; it is more preferably 50:1 to 1:50, and yet more preferably 20:1 to 1:5.

In the present invention, Liquid A and Liquid B may comprise as a polymerization initiator a compound that functions as a sensitizer (hereinafter, also simply called a 'sensitizer') in order to promote decomposition of a polymerization initiator by absorbing specific actinic radiation.

The sensitizer absorbs specific actinic radiation and attains an electronically excited state. The sensitizer in an electronically excited state makes contact with the polymerization initiator to thus cause transfer of an electron, transfer of energy, generation of heat, etc. The photopolymerization initiator thereby undergoes chemical change and decomposes, thus generating a radical, an acid, or a base.

The sensitizer that can be used in the present invention is preferably a sensitizing dye.

Preferred examples of the sensitizing dye include those belonging to the compounds below and having an absorption wavelength in the range of 350 nm to 450 nm.

A polynuclear aromatic compound (e.g. pyrene, perylene, triphenylene), a xanthene (e.g. fluorescein, eosin, erythrosine, rhodamine B, Rose Bengal), a cyanine (e.g. thiacarbocyanine, oxacarbocyanine), a merocyanine (e.g. merocyanine, carbomerocyanine), a thiazine (e.g. thionine, methylene blue, toluidine blue), an acridine (e.g. acridine orange, chloroflavin, acriflavine), an anthraquinone (e.g. anthraquinone), a squarium (e.g. squarium), a coumarin (e.g. 7-diethylamino-4-methylcoumarin), and a thioxanthone (e.g. thioxanthone, isopropylthioxanthone, diethylthioxanthone).

Examples of the sensitizing dye also include those described in paragraphs 0091 to 0104 of JP-A-2011-32348.

With regard to the sensitizer, one type may be used on its own or two or more types may be used in combination.

In the present invention, the content of the sensitizer in Liquid A and Liquid B is selected as appropriate according to the intended purpose, and is preferably 0.05 to 4 mass % relative to the total mass of the composition.

Component I: Difunctional Urethane Acrylate Oligomer

In the present invention, Liquid A preferably further comprises a difunctional urethane acrylate oligomer as Component I. Liquid B comprising Component I is not excluded.

Due to Liquid A comprising Component I, an image having better molding suitability can be obtained.

In the present invention, from the viewpoint of stretchability of an image that is obtained, Liquid A preferably does not comprise a urethane oligomer having three or more (meth)acrylate groups.

In order to enhance stretchability at the time of heating, it is preferable to add as Component I a urethane oligomer having a larger molecular weight at a lower concentration. On the other hand, from the viewpoint of prevention of abrasion due to a mold, it is preferable to add as Component I a urethane oligomer having a smaller molecular weight at a higher concentration. While taking into consideration practically desirable stretchability when heating and desirable appropriate prevention of abrasion due to a mold, the molecular weight (weight-average molecular weight when there is molecular weight distribution) of Component I is preferably 500 to 10,000, more preferably 1,000 to 8,000, and particularly preferably 3,000 to 7,000.

For the same reason, the content of Component I in Liquid A is preferably 0.5 to 4.0 mass % relative to the total mass of Liquid A, more preferably 0.5 to 3.0 mass %, yet more preferably 0.8 to 2.5 mass %, and particularly preferably 1.0 to 2.0 mass %.

With regard to Component I, one type may be used on its own or two or more types may be used in combination.

In the present invention, while taking into consideration compatibility with Component A to Component C contained in Liquid A, practically desirable stretchability when heating, and desirable appropriate prevention of abrasion due to a mold, Component I is preferably a urethane oligomer having all of the constituent units represented by Formulae I1 to I3.

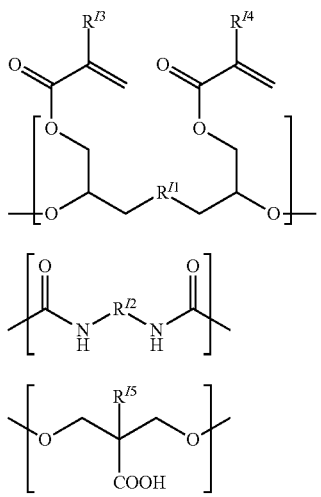

In Formula I1 to Formula I3, $R^{I1}$ and $R^{I2}$ independently denote an alkylene group, an arylene group, or a biarenediyl group, and $R^{I3}$ to $R^{I5}$ independently denote a hydrogen atom, an alkyl group, an aryl group, or a heteroaryl group.

$R^{I1}$ and $R^{I2}$ are independently preferably an alkylene group, and $R^{I1}$ and $R^{I2}$ are more preferably both alkylene groups.

$R^{I3}$ and $R^{I4}$ are independently preferably a hydrogen atom or a methyl group.

$R^{I5}$ is preferably a hydrogen atom or an alkyl group.

The number of carbons of $R^{I1}$ is preferably 1 to 50.

The number of carbons of $R^{I2}$ is preferably 2 to 50.

Furthermore, the number of carbons of $R^{I5}$ is preferably 0 to 20.

Component I is preferably a urethane oligomer comprising a polyester skeleton.

As Component I, a commercial product may be used. Specific examples include CN936, CN961 E75, CN962, CN963, CN963A80, CN963B80, CN963E75, CN963E80, CN963J85, CN964, CN964E75, CN964A85, CN965, CN965A80, CN966A80, CN966H90, CN966J75, CN966R60, CN980, CN981, CN982, CN982A75, CN982B88, CN982E75, CN983, CN985B88, CN996, CN9001, CN9002, CN972, CN973A80, CN973H85, CN973J75, CN978, and CN9783 manufactured by Sartomer; and UN-1225, UN-6200, and UN-9200A manufactured by Negami Chemical Industrial Co.

Component J: Polymerizable Compound Other than Component A to Component C and Component I In the present invention, Liquid A and Liquid B may additionally comprise as Component J a polymerizable compound other than Component A to Component C and Component I, but preferably does not comprise Component J.

As Component J, a known polymerizable compound may be used, and examples include compounds described in paragraphs 0038 to 0042 of JP-A-2011-32348.

When considering molding suitability, a design in which the crosslink density in a film is low is necessary. When curability and molding suitability are taken into consideration, Component J is preferably a monofunctional (meth)acrylate compound or a monofunctional (meth)acrylamide compound, and from the viewpoint of storage stability is particularly preferably a monofunctional (meth)acrylate compound.

The content of Component J is less than 10 mass % relative to the total mass of Component A to Component C in Liquid A or Liquid B, preferably less than 5 mass %, more preferably less than 2 mass %, and particularly preferably zero.

Component K: Dispersant

In the present invention, Liquid A preferably comprises a dispersant as Component K in order to stably disperse the pigment in the composition. Liquid B comprising a dispersant is not excluded.

The dispersant that can be used in the present invention is preferably a polymeric dispersant. The 'polymeric dispersant' in the present invention means a dispersant having a weight-average molecular weight of at least 1,000.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives); Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation); Ionet S-20 (manufactured by Sanyo Chemical Industries, Ltd.); and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant in the ink composition of the present invention is appropriately selected according to the intended purpose, and is preferably 0.05 to 15 mass % relative to the mass of the entire ink composition.

<Other Component>

In the present invention, Liquid A and Liquid B may comprise another component as necessary.

Examples of the other component include a cosensitizer, a surfactant, a UV absorber, an antioxidant, an antifading agent, a conductive salt, a solvent, and a basic compound.

Cosensitizer

In the present invention, Liquid A and Liquid B may comprise a cosensitizer (the 'co-sensitizer' is also called a 'supersensitizer'). In the present invention, the cosensitizer has the function of further improving the sensitivity of the sensitizer to actinic radiation or the function of suppressing inhibition by oxygen of polymerization of a polymerizable compound, etc.

Examples of such a cosensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825, and specific examples thereof include triethanolamine, ethyl p-dimethylaminobenzoate, p-formyldimethylaniline, and p-methylthiodimethylaniline.

Other examples of the cosensitizer include thiols and sulfides such as thiol compounds described in JP-A-53-702, JP-B-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), and Si—H, Ge—H compounds described in JP-A-8-54735.

In the present invention, the content of the cosensitizer in Liquid A or Liquid B is appropriately selected according to the intended purpose, but it is generally preferably 0.05 to 4 mass % relative to the weight of the entire composition.

Surfactant

In the present invention, a surfactant may be added to Liquid A in order to impart long-term discharge stability. Furthermore, Liquid B comprising a surfactant is not excluded.

As the surfactant, those described in JP-A-62-173463 and JP-A-62-183457 can be cited. Examples thereof include anionic surfactants such as dialkylsulfosuccinic acid salts, alkylnaphthalene sulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts.

In the present invention, the content of the surfactant in Liquid A is selected according to the intended application, and it is preferably on the order of 0.0001 to 1 mass % relative to the total mass of the composition.

UV Absorber

A UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is generally on the order of 0.5 to 15 mass % on the basis of the solids content in the composition.

Antioxidant

In order to improve the stability of the composition, an antioxidant may be added to Liquid A and/or Liquid B. Examples of the antioxidant include those described in Laid-open European Patent Nos. 223739, 309401, 309402, 310551, 310552, and 459416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is preferably on the order of 0.1 to 8 mass % on the basis of the solids content in the ink composition.

Antifading Agent

In the present invention, Liquid A and Liquid B may employ various organic and metal complex antifading agents. The organic antifading agents include hydroquinones, alkoxyphenols, dialkoxyphenols, phenols, anilines, amines, indanes, chromans, alkoxyanilines, and heterocycles, and the metal complex antifading agents include nickel complexes and zinc complexes. More specifically, there can be used compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-21572, pages 127 to 137.

The amount thereof added is appropriately selected according to the intended application, and it is preferably 0.1 to 8 mass % on the basis of the solids content in the ink composition.

Solvent

In the present invention, it is also effective to add a trace amount of organic solvent to Liquid A and/or Liquid B in order to improve the adhesion to a substrate.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

When comprising a solvent, it is effective if the amount thereof added is in a range that does not cause problems with the solvent resistance or VOC, and the amount is preferably in the range of 0.1 to 5 mass % relative to the total amount of the ink composition, and more preferably 0.1 to 3 mass %.

In the present invention, Liquid A may contain, for the purpose of controlling discharge properties, a conductive salt such as potassium thiocyanate, lithium nitrate, ammonium thiocyanate, or dimethylamine hydrochloride.

In the present invention, the basic compound is preferably added from the viewpoint of improving the storage stability of Liquid A and Liquid B. A basic compound that can be used in the present invention is a known basic compound, and preferred examples thereof include a basic inorganic compound such as an inorganic salt or a basic organic compound such as an amine.

In addition to the above, the composition may contain as necessary, for example, a leveling additive, a matting agent, a wax for adjusting film physical properties, or a tackifier in order to improve the adhesion to a substrate such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth)acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

3. Ink set

The ink set of the present invention comprises Liquid A and Liquid B. It may be an ink set comprising at least one color of Liquid A and Liquid B, but is preferably an ink set comprising a plurality of colors of Liquid A and Liquid B.

As described above, Liquid A preferably comprises at least four Liquid A colors, that is, cyan, yellow, magenta, and black, and may additionally comprise white, light magenta, light yellow, etc. It may further comprise a Liquid A with a metallic color or a special color (orange, green, etc.).

4. Decorative Sheet, Decorative Sheet Molding, in-Mold Molded Product, and Process for Producing Same <Decorative Sheet and Decorative Sheet Molding>

The image formation method of the present invention is suitably used in the production of a decorative sheet.

The decorative sheet is preferably a printed sheet, having a cured image layer formed by the image formation method of the present invention on at least one face of a resin sheet as a substrate, that is subjected to molding.

The decorative sheet comprises cured image layers of Liquid A and Liquid B provided in order above a resin sheet as a substrate.

Furthermore, it is also preferable to produce a decorative sheet molding by further including a step of molding the decorative sheet. The molding is preferably vacuum forming, pressure forming, or vacuum/pressure forming. Molding is explained in detail.

It is also preferable for the decorative sheet molding to be subjected to hole making.

In particular, since the image layer obtained by the image formation method of the present invention is excellent in terms of stretchability and heat resistance, even when it is subjected to a molding process such as vacuum forming, pressure forming, or vacuum/pressure forming, image dropouts, cracking, etc. are suppressed. Furthermore, the occurrence of cracking of the image during hole making is also suppressed.

'Trimming' in the explanation below means removing an unwanted portion of a molding, etc., and specifically means removing an unwanted portion by cutting or hole making.

<Molding>

The printed material that is obtained by the image formation method of the present invention is preferably a decorative sheet and is excellent in terms of suitability for molding processes such as embossing, vacuum forming, pressure forming, vacuum/pressure forming, hole making, or cutting, is more excellent in terms of suitability for vacuum forming, pressure forming, and vacuum/pressure forming and suitability for trimming processes such as hole making and cutting after the above molding, and is particularly excellent in terms of suitability for vacuum forming and suitability for trimming after vacuum forming. As equipment for molding a printed material, known equipment may be used, and it may be equipment integral with or separate from the inkjet recording equipment.

The process for producing a decorative sheet molding of the present invention preferably comprises a step of heating a printed material that is obtained by the image formation method of the present invention at 70° C. to 200° C. (heating step), and a step of molding the heated printed material into a 3D structure by insertion into a mold and at least carrying out vacuum forming to thus obtain a decorative sheet molding (molding step), and more preferably further comprises a step of subjecting the decorative sheet molding to trimming (trimming step).

The heating step is a step of heating a printed material (decorative sheet) at 70° C. to 200° C. to obtain stretchability for the printed material in order to carry out vacuum forming. The heating temperature may be selected according to the substrate or the cured ink image such that it is a temperature at which hardness or stretchability suitable for vacuum forming is acquired.

The molding step is a step of molding the printed material heated by the heating step into a 3D structure by inserting it into a mold and carrying out vacuum forming. Furthermore, the printed material may be subjected not only to vacuum forming but also to embossing or pressure forming, at the same time as vacuum forming or sequentially. The printed material that is obtained by the image formation method of the present invention has excellent vacuum forming suitability, and in particular even when it is subjected to vacuum forming where the stretching ratio is larger, the occurrence of cracking or whitening is further suppressed.

The trimming step is a step of subjecting the 3D decorative sheet molding obtained by the molding step to a trimming process such as hole making or cutting. The decorative sheet molding obtained by the image formation method of the present invention has suppressed post-molding cracking even when subjected to trimming after vacuum forming.

<Vacuum Forming, Pressure Forming, Vacuum/Pressure Forming>

Vacuum forming is a molding method in which a substrate having an image formed thereon is pre-heated to a temperature at which the substrate can be thermally deformed, and this is sucked onto a mold by reduced pressure while being stretched, pressed against the mold, and cooled, and pressure forming is a molding method in which a substrate having an image formed thereon is pre-heated to a temperature at which the substrate can be thermally deformed, and it is pressed against a mold by applying pressure from the side opposite to the mold and cooled. Vacuum/pressure forming is a molding method in which the above reduced pressure and application of pressure are carried out at the same time.

Details can be referred to in the 'Thermal Molding' section given on p. 766 to 768 of the Polymer Dictionary (Maruzen Co., Ltd.) and references quoted therein. The molding temperature is determined as appropriate according to the type of substrate, and it is preferable for molding to be carried out so that the substrate temperature is 70° C. to 200° C., more preferably 80° C. to 200° C., and yet more preferably 80° C. to 190° C. When in this temperature range, change in color of an image is suppressed, and release from a mold is excellent.

<Trimming>

Trimming is removing an unwanted portion of a decorative sheet molding by hole making, cutting, etc.

In particular, when a printed material (decorative sheet) obtained by the image formation method of the present invention is subjected to vacuum forming to thus obtain a decorative sheet molding, even after vacuum forming, the occurrence of post-molding cracking such as cracking or peeling of a film during trimming (hole making, cutting, etc.) can be suppressed.

Hole making is making a hole having any shape such as a pattern or a character in a printed material, etc., and there is punching using a conventionally known press, etc., hole making by means of drilling, and a hole making method by means of a laser. Among them, punching using a press, etc. is a method suitable when large numbers of identical products are made.

Punching using a press, etc. is a method in which a printed material placed on a mold is sheared using a press equipped with a punching blade.

Cutting is cutting an unwanted portion of a decorative sheet molding, and may be carried out suitably by means of a known press, a hand cutter, a laser processor, etc.

When a decorative sheet or decorative sheet molding obtained by the image formation method of the present invention is subjected to trimming, it is preferably carried out at a temperature of 20° C. to 150° C., more preferably at a temperature of 20° C. to 100° C., and particularly preferably at a temperature of 25° C. to 60° C. When in this range, change in color of the image is suppressed, and release from a mold is excellent.

Embossing

The printed material or the mold obtained by the image formation method may be subjected to embossing.

Embossing is a process in which a three-dimensional feel is given by indenting a printed material, etc. in a desired shape such as a pattern or a letter, and may be carried out using a roller, a press, etc.

Examples of embossing include a hot/cold pressing method, and a method described in JP-A-10-199360, etc. may be referred to.

One example of an embossing system employing the hot/cold pressing method is shown below.

In the embossing system, a lower platen and an upper platen are disposed so that they can move toward and away from each other. A plate-shaped heater is fixed on top of the lower platen, and a plate-shaped heater is also fixed to a lower face of the upper platen. This enables a substrate to be hot pressed while it is heated. In this hot pressing machine, the plate-shaped heater on the lower platen is equipped with a mold having a projection following a predetermined embossing shape, and a mold having a recess that conforms to the shape of the projection is mounted so as to be in contact with the heater fixed to the lower face of the upper platen. A substrate having an image formed thereon is positioned, a cushion sheet is placed between the substrate and the mold with the recess, and the substrate and the cushion sheet are pressed between the upper platen and the lower platen by lowering the upper platen, etc. A pressure applied in this hot pressing step is, for example, 30 tons, and the heating temperature from the plate-shaped heater is, for example, 170° C. The upper platen is pressed against the lower platen, the substrate and the cushion sheet are sandwiched between the molds, and this hot pressing is maintained for about 3 minutes. The substrate is heated by the heaters via the molds, and a plurality of projections are formed due to thermal deformation. Subsequently, the substrate and the cushion sheet sandwiched between the molds are subjected to cold pressing by placing them between internally water-cooled platens without heaters and applying a pressure of, for example, 30 tones by pressing the platens for about 3 minutes. This enables an embossed formed decorative sheet molding to be obtained in which the substrate has a projecting shape due to thermal deformation by the hot pressing. The pressure applied and the heating temperature may be adjusted appropriately according to the material of the printed material and conditions such as the shape that is to be formed, etc.

When the printed material formed using the ink composition of the present invention is embossed, it is preferable to carry out embossing at 20° C. to 150° C., more preferably 20° C. to 100° C., and particularly preferably 25° C. to 60° C. In the above-mentioned range, it is possible to carry out processing in which there is little change in the color of the image and release from a mold is excellent.

<In-Mold Molded Product and Process for Producing Same>

A printed material, preferably a decorative sheet or decorative sheet molding, obtained by the image formation method of the present invention is particularly suitable for in-mold molding.

In the present invention, the process for producing an in-mold molded product preferably comprises (step 1) a step of placing the decorative sheet or the decorative sheet molding of the present invention on an inner wall of a cavity part formed by a plurality of molds, and (step 2) a step of injecting molten resin into the cavity part via a gate.

Examples of (step 1) include a step in which the decorative sheet or a decorative sheet molding of the present invention is placed within a mold and sandwiched. Specifically, the decorative sheet or the decorative sheet molding is fed into a mold for molding formed from a plurality of movable and fixed molds preferably with the image layer on the inside. In this process, in the case of using the decorative sheet, a plurality of decorative sheets may be fed one by one, or a required portion of a long decorative sheet may be fed intermittently.

When a decorative sheet is placed within a mold, (i) it is placed by simply heating a mold and carrying out suction by evacuating the mold to give intimate contact, or (ii) it is placed by heating and softening from the image layer side using a heated platen, preliminarily molding the decorative sheet so as to follow the shape of the interior of the mold, and carrying out mold clamping so that there is intimate contact with an inner face of the mold. The heating temperature in (ii) is preferably at least around the glass transition temperature of a substrate film but less than the melting temperature (or melting point), and it is normally a temperature around the glass transition temperature. Around the glass transition temperature means a range of on the order of ±5° C. of the glass transition temperature, and is generally on the order of 70° C. to 130° C. In the case of (ii), for the purpose of putting the decorative sheet into intimate contact with the mold surface, when heating and softening the decorative sheet using a heated platen, suction by evacuating may be carried out.

In the present invention, a preliminarily molded decorative sheet molded product may be placed in a mold.

(Step 2) is an injection step in which a molten resin is injected into the cavity (hollow part) and cooled/solidified to thus laminate and integrate a resin molding and a decorative sheet or a decorative sheet molding. When the injection resin is a thermoplastic resin, it is put into a fluid state by heating and melting, and when the injection resin is a thermosetting resin, an uncured liquid composition is heated as appropriate and injected in a fluid state, and solidified by cooling. This enables the decorative sheet to integrate with and stick to the resin molding thus formed, thereby giving a decorative molded article. The heating temperature for the injection resin depends on the injection resin, but is preferably on the order of 180° C. to 280° C.

Injection Resin

Any injection resin may be used in the decorative molded article as long as it is a thermoplastic resin or thermosetting resin (including a two-component curable resin) that can be injection-molded, and various resins may be used. Examples of such thermoplastic resin materials include a polystyrene-based resin, a polyolefin-based resin, an ABS resin (including a heat-resistant ABS resin), an AS resin, an AN resin, a polyphenylene oxide-based resin, a polycarbonate-based resin, a polyacetal-based resin, an acrylic-based resin, a polyethylene terephthalate-based resin, a polybutylene terephthalate-based resin, a polysulfone-based resin, and a polyphenylene sulfide-based resin. Examples of the thermosetting resin include a two-component reaction-curing type polyurethane-based resin and an epoxy-based resin. These resins may be used singly or as a mixture of two or more types.

In addition to the above steps, it is preferable to have a step of removing from the mold a molding having a resin molding integrated with a decorative sheet.

In accordance with the present invention, there can be provided an image formation method that can give an image that is excellent in terms of adhesion to a substrate, blocking resistance of a resulting printed material, and molding suitability (vacuum forming, pressure forming, or vacuum/pressure forming suitability, in particular vacuum forming suitability), and that can suppress post-molding cracking of a molding. In particular, there can be provided an image formation method that can give an image for which hardly any abrasion due to a mold occurs even when molding is carried out for a hard substrate such as polycarbonate, in particular a hard substrate such as polycarbonate having a thickness of 1 mm to 3 mm. Furthermore, there can be provided a decorative sheet using the image formation method, a decorative sheet molding, a process for producing an in-mold molded product, an in-mold molded product, and an ink set used in the image formation method.

'Molding suitability' means being excellent in terms of stretchability of a cured film at the time of molding, in particular at the time of vacuum forming, pressure forming, or vacuum/pressure forming, having suppressed damage to an image by a mold, and being excellent in terms of release from a mold.

EXAMPLES

The present invention is explained in further detail by reference to Examples and Comparative Examples. However, the present invention should not be construed as being limited to these Examples. 'Parts' and '%' described below means 'parts by mass' and 'mass %' unless otherwise specified.

Furthermore, the designations CMYKW for the color of Liquid A have the meanings C: cyan, M: magenta, Y: yellow, K: black, and W: white.

The materials used in the Examples and Comparative Examples were as follows.
(Pigment)
PB 15:4: cyan pigment, C.I. Pigment Blue 15:4, HELIOGEN BLUE D 7110 F, manufactured by BASF
Mixed quinacridones: magenta pigment, CINQUASIA MAGENTA L 4540, manufactured by BASF
PY 155: yellow pigment, C.I. Pigment Yellow 155, INK JET YELLOW 4GC, manufactured by Clariant
CB: black pigment, carbon black, MOGUL E, manufactured by CABOT
$TiO_2$: white pigment, titanium oxide, KRONOS 2300, manufactured by KRONOS
(Dispersants)
Dispersant A: SOL 32000, SOLSEPERSE 32000, manufactured by Lubrizol
Dispersant B: SOL 41000, SOLSEPERSE 41000, manufactured by Lubrizol
(Polymerization Inhibitors)
UV-12: nitroso-based polymerization inhibitor, tris(N-nitroso-N-phenylhydroxyolamine)aluminium salt, FLORSTAB UV12, manufactured by Kromachem
OH-TEMPO: 4-hydroxy-2,2,6,6-tetramethylpiperidine-1-oxl, 4-HYDROXY TEMPO, manufactured by Evonik
(Aromatic Ring-Containing Monofunctional Acrylate)
Monomer A: PEA, 2-phenoxyethylacrylate, SR339C, manufactured by Sartomer
(Aliphatic Hydrocarbon Ring-Containing Monofunctional Acrylates)
IBOA: isobornyl acrylate, SR506, manufactured by Sartomer
TMCHA: 3,3,5-trimethylcyclohexyl acrylate, SR420, manufactured by Sartomer
TBCHA: t-butylcyclohexyl acrylate, SR217, manufactured by Sartomer (N-vinylcaprolactam)
NVC: N-vinylcaprolactam, manufactured by BASF
(Difunctional Aliphatic Urethane Acrylate Oligomers)
CN965: aliphatic urethane acrylate oligomer (difunctional), weight-average molecular weight: 4,000, manufactured by Sartomer
CN936: aliphatic urethane acrylate oligomer (difunctional), weight-average molecular weight: 4,000, manufactured by Sartomer
(Polymerization Initiators)
ITX: isopropylthioxanthone, SPEEDCURE ITX, manufactured by Lambson
TPO: 2,4,6-trimethylbenzoyldiphenylphosphine oxide, LUCIRIN TPO, manufactured by BASF
Irg 819: bis(2,4,6-trimethylbenzoyl)phenylphosphine oxide, IRGACURE 819, manufactured by BASF
(Resins)
ELVACITE 2013 (methyl methacrylate/n-butyl methacrylate copolymer, Tg: 76° C., weight-average molecular weight: 34,000, Lucite International)
ELVACITE 3000 (acrylic resin, Tg: 105° C., weight-average molecular weight: 39,000, Lucite International)
ELVACITE 4026 (acrylic resin, Tg: 75° C., weight-average molecular weight: 32,500, Lucite International)
ELVACITE 2823 (methyl methacrylate/n-butyl methacrylate copolymer, Tg: 76° C., weight-average molecular weight: 34,000, Lucite International)
ELVACITE 2927 (acrylic resin, Tg: 45° C., weight-average molecular weight: 19,000, Lucite International)
TEGORAD 2010 (silicone polyether acrylate, penta- to hexa-functional, Evonic,)
Polyethylene wax 1 (Ceridust 3715, Clariant)
(Preparation of Pigment Dispersion)
Components described in Table 1 below other than the pigment were mixed and stirred using a SILVERSON mixer (10 to 15 minutes, 2,000 to 3,000 rpm) to thus give a uniform transparent liquid (dispersant dilution liquid). The pigment described in Table 1 was added to this transparent liquid (dispersant dilution liquid), and the mixture was further stirred using the mixer (10 to 20 minutes, 2,000 to 3,000 rpm) to give 500 parts of a uniform preliminary dispersion. Subsequently, a dispersion treatment was carried out using a circulating bead mill (SL-012C1) manufactured by Dispermat. Dispersion conditions were such that 200 parts of zirconia beads having a diameter of 0.65 mm were charged and the peripheral speed was 15 m/s. The dispersion time was 1 to 6 hours. In the table, each of the numbers denotes the amount added (parts by mass), and '-' means that the corresponding component was not added.

TABLE 1

|  |  | C dispersion | M dispersion | Y dispersion | K dispersion |
|---|---|---|---|---|---|
| Cyan pigment | PB 15:4 | 30 | — | — | — |
| Magenta pigment | Mixed quinacridones | — | 30 | — | — |
| Yellow pigment | PY155 | — | — | 30 | — |
| Black pigment | CB | — | — | — | 40 |
| Dispersant A | SOL 32000 | 10 | 10 | 10 | 10 |
| Dispersant B | SOL 41000 | — | — | — | — |
| Inhibitor | UV-12 | 1 | 1 | 1 | 1 |
| Monomer A | PEA | 59 | 59 | 59 | 49 |

(Preparation of Liquid a (Magenta, Yellow, Black))

Components described in Table 2 other than the polymerization initiator and the pigment dispersion were stirred using a SILVERSON mixer (60 minutes, 3,000 to 5,000 rpm) to give a uniform transparent liquid. The polymerization initiator and the pigment dispersion were added to this transparent liquid01 and stirred (10 to 20 minutes, 2,000 to 3,000 rpm) to give a Liquid A composition for each of magenta, yellow, and black. In the table, each of the numbers denotes the amount added (parts by mass), and '-' means that the corresponding component was not added.

TABLE 2

|  | Liquid A | | |
|---|---|---|---|
|  | M | Y | K |
| PEA | 14.6 | 20.5 | 21.6 |
| IBOA | 40.0 | 40.0 | 40.0 |
| NVC | 20.0 | 20.0 | 20.0 |
| CN965 | 1.0 | 1.0 | 1.0 |
| OH-TEMP | 0.3 | 0.3 | 0.3 |
| ITX | 1.0 | 1.0 | 1.0 |
| TPO | 2.8 | 2.8 | 2.8 |

TABLE 2-continued

|  | Liquid A | | |
|---|---|---|---|
|  | M | Y | K |
| Irg819 | 2.8 | 2.8 | 2.8 |
| M dispersion | 13.5 | — | — |
| Y dispersion | — | 7.6 | — |
| K dispersion | — | — | 6.5 |
| ELVACITE2013 (Tg: 80° C.) | 2.0 | 2.0 | 2.0 |
| TEGORAD2010 | 2.0 | 2.0 | 2.0 |
| TOTAL | 100.0 | 100.0 | 100.0 |

(Preparation of Liquid a (Cyan))

Components described in Table 3 and Table 4 other than the polymerization initiator and the pigment dispersion were stirred by a SILVERSON mixer (60 minutes, 3,000 to 5,000 rpm) to give a uniform transparent liquid. The polymerization initiator and the pigment dispersion were added to this transparent liquid and stirred (10 to 20 minutes, 2,000 to 3,000 rpm) to give cyan Liquid A. In the table, each of the numbers denotes the amount added (parts by mass), and '-' means that the corresponding component was not added.

TABLE 3

|  | A1 | A2 | A3 | A4 | A5 | A6 | A7 | A8 |
|---|---|---|---|---|---|---|---|---|
| PEA | 19.8 | 19.8 | 19.8 | — | 59.8 | 39.8 | 21.3 | 16.8 |
| IBOA | 40.0 | — | — | 59.8 | — | 40.0 | 40.0 | 40.0 |
| TMCHA | — | 40.0 | — | — | — | — | — | — |
| TBCHA | — | — | 40.0 | — | — | — | — | — |
| NVC | 20.0 | 20.0 | 20.0 | 20.0 | 20.0 | — | 20.0 | 20.0 |
| CN965 (MW: 4,000) | 1.0 | 1.0 | 1.0 | 1.0 | 1.0 | 1.0 | 1.0 | 1.0 |
| OH-TEMP | 0.3 | 0.3 | 0.3 | 0.3 | 0.3 | 0.3 | 0.3 | 0.3 |
| ITX | 1.0 | 1.0 | 1.0 | 1.0 | 1.0 | 1.0 | 1.0 | 1.0 |
| TPO | 2.8 | 2.8 | 2.8 | 2.8 | 2.8 | 2.8 | 2.8 | 2.8 |
| Irg819 | 2.8 | 2.8 | 2.8 | 2.8 | 2.8 | 2.8 | 2.8 | 2.8 |
| C dispersion | 8.3 | 8.3 | 8.3 | 8.3 | 8.3 | 8.3 | 8.3 | 8.3 |
| ELVACITE 2013 (Tg: 80° C.) | 2.0 | 2.0 | 2.0 | 2.0 | 2.0 | 2.0 | 0.5 | 5.0 |
| TEGORAD2010 | 2.0 | 2.0 | 2.0 | 2.0 | 2.0 | 2.0 | 2.0 | 2.0 |
| TOTAL | 100.0 | 100.0 | 100.0 | 100.0 | 100.0 | 100.0 | 100.0 | 100.0 |

TABLE 4

|  | A9 | A10 | A11 | A12 | A13 | A14 | A15 | A16 |
|---|---|---|---|---|---|---|---|---|
| PEA | 21.6 | 15.8 | 19.8 | 19.8 | 19.8 | 21.8 | 20.8 | 19.8 |
| IBOA | 40.0 | 40.0 | 40.0 | 40.0 | 40.0 | 40.0 | 40.0 | 40.0 |
| NVC | 20.0 | 20.0 | 20.0 | 20.0 | 20.0 | 20.0 | 20.0 | 20.0 |
| CN965(MW: 4,000) | 1.0 | 1.0 | 1.0 | 1.0 | 1.0 | 1.0 | — | — |
| CN936(MW: 5,600) | — | — | — | — | — | — | — | 1.0 |
| OH-TEMP | 0.3 | 0.3 | 0.3 | 0.3 | 0.3 | 0.3 | 0.3 | 0.3 |
| ITX | 1.0 | 1.0 | 1.0 | 1.0 | 1.0 | 1.0 | 1.0 | 1.0 |
| TPO | 2.8 | 2.8 | 2.8 | 2.8 | 2.8 | 2.8 | 2.8 | 2.8 |

TABLE 4-continued

|  | A9 | A10 | A11 | A12 | A13 | A14 | A15 | A16 |
|---|---|---|---|---|---|---|---|---|
| Irg819 | 2.8 | 2.8 | 2.8 | 2.8 | 2.8 | 2.8 | 2.8 | 2.8 |
| C dispersion | 8.3 | 8.3 | 8.3 | 8.3 | 8.3 | 8.3 | 8.3 | 8.3 |
| ELVACITE 2013 (Tg: 80° C.) | 0.2 | 6.0 | — | — | — | 2.0 | 2.0 | 2.0 |
| ELVACITE 2823 (Tg: 50° C.) | — | — | 2.0 | — | — | — | — | — |
| ELVACITE 2927 (Tg: 45° C.) | — | — | — | 2.0 | — | — | — | — |
| ELVACITE 3000 (Tg: 105° C.) | — | — | — | — | 2.0 | — | — | — |
| TEGORAD2010 | 2.0 | 2.0 | 2.0 | 2.0 | 2.0 | — | 2.0 | 2.0 |
| TOTAL | 100.0 | 100.0 | 100.0 | 100.0 | 100.0 | 100.0 | 100.0 | 100.0 |

<Preparation of Liquid B>

Components described in Table 5 and Table 6 other than the polymerization initiator and the pigment dispersion were stirred by a SILVERSON mixer (60 minutes, 1,000 to 3,000 rpm) to give a uniform transparent liquid. The polymerization initiator and the pigment were added to this transparent liquid and stirred (30 minutes, 1,000 to 2,000 rpm) to give a Liquid B composition. In the table, each of the numbers denotes the amount added (parts by mass), and '-' means that the corresponding component was not added.

TABLE 5

|  | B1 | B2 | B3 | B4 | B5 | B6 | B7 |
|---|---|---|---|---|---|---|---|
| PEA | 23.1 | 13.1 | 25.1 | 33.1 | 3.1 | 43.1 | 0.1 |
| IBOA | 18.0 | 18.0 | 18.0 | 18.0 | 18.0 | 18.0 | 18.0 |
| NVC | 18.0 | 18.0 | 18.0 | 18.0 | 18.0 | 18.0 | 18.0 |
| OH-TEMP | 0.3 | 0.3 | 0.3 | 0.3 | 0.3 | 0.3 | 0.3 |
| ITX | 1.0 | 1.0 | 1.0 | 1.0 | 1.0 | 1.0 | 1.0 |
| TPO | 2.8 | 2.8 | 2.8 | 2.8 | 2.8 | 2.8 | 2.8 |
| Irg819 | 2.8 | 2.8 | 2.8 | 2.8 | 2.8 | 2.8 | 2.8 |
| $TiO_2$ | — | 20.0 | — | — | — | — | — |
| Polyethylenewax 1 | 2.0 | 2.0 | — | 2.0 | 2.0 | 2.0 | 2.0 |
| ELVACITE 2013(Tg: 105° C.) | 30.0 | 20.0 | 30.0 | 20.0 | 50.0 | 10.0 | 53.0 |
| TEGORAD2010 | 2.0 | 2.0 | 2.0 | 2.0 | 2.0 | 2.0 | 2.0 |
| TOTAL | 100.0 | 100.0 | 100.0 | 100.0 | 100.0 | 100.0 | 100.0 |

TABLE 6

|  | B8 | B9 | B10 | B11 | B12 | B13 | B14 |
|---|---|---|---|---|---|---|---|
| PEA | 25.1 | 41.1 | — | 23.1 | 23.1 | 23.1 | 23.1 |
| IBOA | 18.0 | 18.0 | 41.0 | 18.0 | 18.0 | 18.0 | — |
| TMCHA | — | — | — | — | — | — | 18.0 |
| NVC | 18.0 | — | 18.0 | 18.0 | 18.0 | 18.0 | 18.0 |
| OH-TEMP | 0.3 | 0.3 | 0.3 | 0.3 | 0.3 | 0.3 | 0.3 |
| ITX | 1.0 | 1.0 | 1.0 | 1.0 | 1.0 | 1.0 | 1.0 |
| TPO | 2.8 | 2.8 | 2.8 | 2.8 | 2.8 | 2.8 | 2.8 |
| Irg819 | 2.8 | 2.8 | 2.8 | 2.8 | 2.8 | 2.8 | 2.8 |
| Polyethylenewax 1 | 2.0 | 2.0 | 2.0 | 2.0 | 2.0 | 2.0 | 2.0 |
| ELVACITE 3000(Tg: 105° C.) | 30.0 | 30.0 | 30.0 | — | — | — | 30.0 |
| ELVACITE 4026(Tg: 75° C.) | — | — | — | 30.0 | — | — | — |
| ELVACITE 2823(Tg: 50° C.) | — | — | — | — | 30.0 | — | — |
| ELVACITE 2927(Tg: 45° C.) | — | — | — | — | — | 30.0 | — |
| TEGORAD2010 | 2.0 | 2.0 | 2.0 | 2.0 | 2.0 | 2.0 | 2.0 |
| TOTAL | 100.0 | 100.0 | 100.0 | 100.0 | 100.0 | 100.0 | 100.0 |

(Evaluation Methods)

A commercial inkjet printer (Acuity 350, Fujifilm Corporation) was charged with the Liquid A thus produced, and a printed sample (100%) was produced. The substrate was polycarbonate (PC, thickness: 0.75 mm, Lexan Polycarbonate, Robert Horne), glycol-modified polyethylene terephthalate (PETG, thickness: 1.00 mm, Falcon Petg, Robert Horne), polystyrene (PS, thickness: 1.00 mm, Falcon Hi Impact Polystyrene, Robert Horne), or thick polycarbonate (thick PC, thickness: 2.0 mm, Lexan Polycarbonate, Robert Horne). Here, 100% means conditions for the maximum amount of ink to be obtained when printing was carried out under standard printing conditions for the printer. The lamp strength was fixed at a setting of Lamp 7, and the amount of exposure could be changed by placing in the irradiation section a slit whose opening width was adjustable.

After inkjet printing, Liquid B was printed by a roller coater. The height of the roller was adjusted so that the film thickness of Liquid B was 6 to 8 μm. Subsequently, Liquid B was cured by means of UV exposure.

<Evaluation Item 1 (Degree of Cure of Liquid A)>

A sample was taken out immediately after curing Liquid A, and the mass of Liquid A remaining on the substrate was measured by a transfer test to thus calculate the degree of cure.

Degree of cure (%)=(mass of Liquid A remaining on substrate after transfer test)/(mass of Liquid A on substrate before transfer test)×100

The transfer test was carried out using as a permeable medium plain paper (copier paper C2, product code V436, Fuji Xerox Co., Ltd.). The plain paper was pressed with a constant force (a constant force in the range of 500 to 1,000 mN/cm$^2$) against semi-cured Liquid A on the recording medium (substrate) that had been taken out and allowed to stand for about 1 minute. Subsequently, the plain paper was peeled off gently, and the mass of the plain paper before and after the transfer test was measured. Furthermore, the mass of the substrate before application of Liquid A, the mass of the substrate after application of Liquid A, and the mass of the substrate after the transfer test were measured, and the degree of cure was determined from these measurement values.

The size of the substrate was A4 size, which was the same as for the plain paper, and the degree of cure was unchanged when using any of PC, PETG, PS, and thick PC as the substrate.

<Test Item 1 (Blocking Resistance (PC, Coated Paper))>

A printed material was produced by the printer, polycarbonate (PC) or a coated paper was superimposed on the printed face, a weight of 4 kg per A4 size was placed thereon, and the assembly was allowed to stand at room temperature (25° C.) for 24 hours. 24 hours later, the superimposed substrate (PC (thickness: 0.75 mm, Lexan Polycarbonate, Robert Horne) or coated paper) was peeled off from the printed face, and blocking resistance was evaluated using the criteria below.

Even when PC was used as a substrate for superimposition or a coated paper was used, the evaluation results were the same. Furthermore, even when any of PC, PETG, and PS was used as the recording medium (substrate), the evaluation results were the same.

Excellent: when superimposed substrate was peeled off from printed face, there was no sound and no transfer
Good: when superimposed substrate was peeled off from printed face, there was sound but no transfer
Fair: slight transfer of transparency
Poor: transfer of color <Test Item 2 (Adhesion (PC))>

After a printed material was produced by the printer and allowed to stand for 24 hours at room temperature (25° C.), a cross-cut test was carried out and adhesion was evaluated.
Excellent: score of 0 based on JIS K5600-5-6 (ISO2409)
Good: score of 1 based on JIS K5600-5-6 (ISO2409)
Fair: score of 2 based on JIS K5600-5-6 (ISO2409)
Poor: score of 3 or more based on JIS K5600-5-6 (ISO2409)

<Test Item 3 (Vacuum Forming Suitability (PC))>

After a printed material was produced by the printer and allowed to stand at room temperature (25° C.) for 24 hours, a molded printed material (decorative sheet molding) was produced using a vacuum forming machine (Model 725FLB Vacuum Former) manufactured by C. R. Clarke. Here, the material was placed so that the printed face was on the mold side, and molding was carried out. PC was used as the substrate.

A heater was set so that the substrate temperature reached 180° C. within 30 seconds, and the heating time was 60 seconds. Three types of molds (mold 1: rectangular parallelepiped with area 10 cm×10 cm and height 2 cm, mold 2: rectangular parallelepiped with area 10 cm×10 cm and height 5 cm, mold 3: rectangular parallelepiped with area 10 cm×10 cm and height 10 cm) were used. By leaving a constant time between the heating step and the mold insertion step, the temperature when the mold was inserted was made constant (180° C., 170° C., 165° C., 160° C.).

After vacuum forming, evaluation was carried out using the criteria below.

Evaluation of film stretchability: cracking of film was examined at substrate temperature of 180° C.
Excellent: no film cracking in molds 1, 2, and 3 and no whitening
Good: no film cracking in molds 1, 2, and 3
Fair: no film cracking in molds 1 and 2
Poor: film cracking in molds 1 and 2

Evaluation of resistance to damage due to mold: film damage was examined at substrate temperatures of 170° C., 165° C., and 160° C.

For evaluation of damage resistance, evaluation was carried out using mold 3.
Excellent: no damage for all of the temperatures
Good: no damage for 165° C. or higher
Fair: no damage for 170° C. or higher
Poor: damaged at 170° C. or higher Damage due to the mold easily occurred when the substrate temperature was low. It is surmised that this is because molding is carried out in a state in which the substrate is relatively hard.

Evaluation of release properties from mold: release properties of sample from mold were evaluated at substrate temperature of 180° C.

For evaluation of release properties from a mold, evaluation was carried out using mold 3.
Excellent: release was possible by pressure alone and there was no film deformation caused by release
Good: release was possible by pressure alone and there was no film deformation caused by release. However, there was a sound at the time of release
Fair: release was possible by pressure alone but there was film deformation caused by release (shape was normal after molding)
Poor: release was impossible by pressure alone or there was film deformation caused by release (shape did not return to normal after molding)

<Test Item 4 (Vacuum Forming Suitability (PETG))>

After a printed material was produced by the printer and allowed to stand for 24 hours at room temperature (25° C.), a molded printed material (decorative sheet molding) was produced using a vacuum forming machine (Vacuum Former Model 725FLB) manufactured by C. R. Clarke. Here, the material was placed so that the printed face was on the mold side, and molding was carried out. As the substrate, PETG was used.

The heater was set so that the substrate temperature reached 180° C. within 30 seconds, and the heating time was 30 seconds. Three types of molds (mold 1: rectangular parallelepiped with area 10 cm×10 cm and height 2 cm, mold 2: rectangular parallelepiped with area 10 cm×10 cm and height 5 cm, mold 3: rectangular parallelepiped with area 10 cm×10 cm and height 10 cm) were used. By leaving a constant time between the heating step and the mold insertion step, the temperature when the mold was inserted was made constant (150° C., 140° C., 135° C., 130° C.).

After vacuum forming, evaluation was carried out using the criteria below.

Evaluation of film stretchability: cracking of film was examined at substrate temperature of 150° C.
Excellent: no film cracking in molds 1, 2, and 3 and no whitening
Good: no film cracking in molds 1, 2, and 3
Fair: no film cracking in molds 1 and 2
Poor: film cracking in molds 1 and 2

Evaluation of resistance to damage due to mold: film damage was examined at substrate temperatures of 140° C., 135° C., and 130° C.

For evaluation of damage resistance, evaluation was carried out using mold 3.

Excellent: no damage for all of the temperatures
Good: no damage for 135° C. or higher
Fair: no damage for 140° C. or higher
Poor: damaged at 140° C. or higher Evaluation of release properties from mold: release properties of sample from mold were evaluated at substrate temperature of 140° C.

For evaluation of release properties from mold, evaluation was carried out using mold 3.

Excellent: release was possible by pressure alone and there was no film deformation caused by release
Good: release was possible by pressure alone and there was no film deformation caused by release. However, there was a sound at the time of release
Fair: release was possible by pressure alone but there was film deformation caused by release (shape was normal after molding)
Poor: release was impossible by pressure alone or there was film deformation caused by release (shape did not return to normal after molding)

<Test Item 5 (Vacuum Forming Suitability (PS))>

After a printed material was produced by the printer and allowed to stand for 24 hours at room temperature (25° C.), a molded printed material (decorative sheet molding) was produced using a vacuum forming machine (Vacuum Former Model 725FLB) manufactured by C. R. Clarke. Here, the material was placed so that the face opposite to the printed face was on the mold side, and molding was carried out. As the substrate, PS was used.

The heater was set so that the substrate temperature reached 180° C. within 30 seconds, and the heating time was 25 seconds. Three types of molds (mold 1: rectangular parallelepiped with area 10 cm×10 cm and height 2 cm, mold 2: rectangular parallelepiped with area 10 cm×10 cm and height 5 cm, mold 3: rectangular parallelepiped with area 10 cm×10 cm and height 10 cm) were used. By leaving a constant time between the heating step and the mold insertion step, the temperature when the mold was inserted was made constant (140° C.).

After vacuum forming, evaluation was carried out using the criteria below.

Evaluation of film stretchability: cracking of film was examined at substrate temperature of 140° C.
Excellent: no film cracking in molds 1, 2, and 3 and no whitening
Good: no film cracking in molds 1, 2, and 3
Fair: no film cracking in molds 1 and 2
Poor: film cracking in molds 1 and 2

<Test Item 6 (Vacuum Forming Suitability (Thick PC))>

After a printed material was produced by the printer and allowed to stand for 24 hours at room temperature (25° C.), a molded printed material (decorative sheet molding) was produced using a vacuum forming machine (Vacuum Former Model 725FLB) manufactured by C. R. Clarke. Here, the material was placed so that the printed face was on the mold side, and molding was carried out. As the substrate, thick PC was used.

The heater was set so that the substrate temperature reached 220° C. within 90 seconds, and the heating time was 90 seconds. Three types of molds (mold 1: rectangular parallelepiped with area 10 cm×10 cm and height 2 cm, mold 2: rectangular parallelepiped with area 10 cm×10 cm and height 5 cm, mold 3: rectangular parallelepiped with area 10 cm×10 cm and height 10 cm) were used. By leaving a constant time between the heating step and the mold insertion step, the temperature when the mold was inserted was made constant (210° C., 200° C., 195° C., 190° C.).

After vacuum forming, evaluation was carried out using the criteria below.

Evaluation of film stretchability: cracking of film was examined at substrate temperature of 210° C.
Excellent: no film cracking in molds 1, 2, and 3 and no whitening
Good: no film cracking in molds 1, 2, and 3
Fair: no film cracking in molds 1 and 2
Poor: film cracking in molds 1 and 2

Evaluation of resistance to damage due to mold: film damage was examined at substrate temperatures of 170° C., 165° C., and 160° C.

For evaluation of damage resistance, evaluation was carried out using mold 2.

Excellent: no damage for all of the temperatures
Good: no damage for 195° C. or higher
Fair: no damage for 200° C. or higher
Poor: damaged at 200° C. or higher Damage due to the mold easily occurred when the substrate temperature was low. It is surmised that this is because molding is carried out in a state in which the substrate is relatively hard.

Evaluation of release properties from mold: release properties of sample from mold were evaluated at substrate temperature of 210° C.

For evaluation of the release properties from the mold, evaluation was carried out using mold 2.

Excellent: release was possible by pressure alone and there was no film deformation caused by release
Good: release was possible by pressure alone and there was no film deformation caused by release. However, there was a sound at the time of release
Fair: release was possible by pressure alone but there was film deformation caused by release (shape was normal after molding)
Poor: release was impossible by pressure alone or there was film deformation caused by release (shape did not return to normal after molding)

<Test Item 7 (Trimming Suitability)>

A sample produced in the test for vacuum forming suitability was subjected to a trimming treatment. A portion spaced by 0.5 cm from the rise of the rectangular parallelepiped was cut using a hand cutter, and a hole was made in an upper part of the rectangular parallelepiped using a drill.

Hole making using a drill was evaluated using thick PC (thickness: 2 mm) as a substrate for a sample molded by mold 2. Furthermore, cutting using a hand cutter was evaluated using PC (thickness: 0.75 mm) as a substrate for a sample molded by mold 3.

Example 1

A commercial inkjet printer (Acuity 350, Fujifilm Corporation) was charged with magenta, yellow, and black Liquids A and cyan Liquid A1, and print samples (100%) were produced thereby. Within 10 minutes after printing, Liquid B1 was applied to a cured film of Liquid A by means of a roller coater charged with Liquid B1. Printed materials were produced under conditions 1, 2, 3, and 4 shown in Table 7. The results of evaluation of printed materials produced under each of the conditions are shown in Table 8.

TABLE 7

|  | Slit width | Time from printing of liquid B to exposure |
| --- | --- | --- |
| Conditions 1 | Fully open | 5 to 10 sec. |
| Conditions 2 | Fully open | 20 to 25 sec. |
| Conditions 3 | 2 cm | 5 to 10 sec. |
| Conditions 4 | 1 cm | 5 to 10 sec. |

TABLE 8

|  |  | Conditions 1 Ex. | Conditions 2 Ex. | Conditions 3 Ex. | Conditions 4 Comp. Ex. |
|---|---|---|---|---|---|
|  | Degree of cure | 100% | 100% | 90-95% | 75-80% |
|  | Test item 1 (blocking resistance (PC, coated paper)) | Exc. | Exc. | Exc. | Poor |
|  | Test item 2 (adhesion (PC)) | Exc. | Exc. | Exc. | Poor |
| Test item 3 (PC) | Evaluation of film stretchability | Exc. | Exc. | Exc. | Exc. |
|  | Evaluation of resistance to damage due to mold | Exc. | Fair | Fair | Poor |
|  | Evaluation of release properties | Exc. | Exc. | Exc. | Exc. |
| Test item 4 (PETG) | Evaluation of film stretchability | Exc. | Exc. | Exc. | Exc. |
|  | Evaluation of resistance to damage due to mold | Exc. | Good | Good | Poor |
|  | Evaluation of release properties | Exc. | Exc. | Exc. | Exc. |
| Test item 5 (PS) | Evaluation of film stretchability | Exc. | Exc. | Exc. | Exc. |
| Test item 6 (thick PC) | Evaluation of film stretchability | Exc. | Exc. | Exc. | Exc. |
|  | Evaluation of resistance to damage due to mold | Exc. | Fair | Fair | Poor |
|  | Evaluation of release properties | Exc. | Exc. | Exc. | Exc. |
|  | Test item 7 (trimming suitability) | Exc. | Exc. | Exc. | Exc. |

Example 2

A commercial inkjet printer (Acuity 350, Fujifilm Corporation) was charged with cyan Liquids A1 to A16 as shown in Tables 9 and 10, and print samples (100%) were produced using cyan alone. Within 10 minutes after printing, Liquid B1 was applied to a cured film of Liquid A by means of a roller coater charged with Liquid B1. Printed materials were produced under conditions 1 shown in Table 7. The results of evaluation of printed materials produced by each Liquid A are shown in Tables 9 and 10.

TABLE 9

|  |  | A1 Ex. | A2 Ex. | A3 Ex. | A4 Comp. Ex. | A5 Comp. Ex. | A6 Comp. Ex. | A7 Ex. | A8 Ex. |
|---|---|---|---|---|---|---|---|---|---|
|  | Degree of cure | 100% | 100% | 100% | 100% | 100% | 70-75% | 100% | 100% |
|  | Test item 1 (blocking resistance (PC, coated paper)) | Exc. | Exc. | Exc. | Exc. | Fair | Poor | Good | Exc. |
|  | Test item 2 (adhesion (PC)) | Exc. | Exc. | Exc. | Fair | Exc. | Poor | Fair | Exc. |
| Test item 3 (PC) | Evaluation of film stretchability | Exc. | Exc. | Exc. | Exc. | Fair | Poor | Exc. | Exc. |
|  | Evaluation of resistance to damage due to mold | Exc. | Exc. | Exc. | Exc. | Poor | Poor | Fair | Exc. |
|  | Evaluation of release properties | Exc. | Exc. | Exc. | Exc. | Poor | Poor | Good | Exc. |
| Test item 4 (PETG) | Evaluation of film stretchability | Exc. | Exc. | Exc. | Exc. | Fair | Poor | Exc. | Exc. |
|  | Evaluation of resistance to damage due to mold | Exc. | Exc. | Exc. | Exc. | Good | Poor | Exc. | Exc. |
|  | Evaluation of release properties | Exc. | Exc. | Exc. | Exc. | Good | Poor | Exc. | Exc. |
| Test item 5 (PS) | Evaluation of film stretchability | Exc. | Exc. | Exc. | Exc. | Fair | Exc. | Exc. | Exc. |
| Test item 6 (thick PC) | Evaluation of film stretchability | Exc. | Exc. | Exc. | Exc. | Fair | Poor | Exc. | Exc. |
|  | Evaluation of resistance to damage due to mold | Exc. | Exc. | Exc. | Exc. | Poor | Poor | Fair | Exc. |
|  | Evaluation of release properties | Exc. | Exc. | Exc. | Exc. | Poor | Poor | Good | Exc. |
|  | Test item 7 (trimming suitability) | Exc. | Exc. | Exc. | Poor | Exc. | Exc. | Exc. | Good |

TABLE 10

|  |  | A9 Comp. Ex. | A10 Comp. Ex. | A11 Ex. | A12 Ex. | A13 Comp. Ex. | A14 Comp. Ex. | A15 Ex. | A16 Ex. |
|---|---|---|---|---|---|---|---|---|---|
|  | Degree of cure | 100% | Evaluation stopped because of poor discharge. Discharge dropouts/curvature occurred in 10 or more nozzles even if head cleaning carried out 10 or more times in succession | 100% | 100% | Evaluation stopped because of poor discharge. Discharge dropouts/curvature occurred in 10 or more nozzles even if head cleaning carried outs 10 or more time in succession | 100% | 100% | 100% |
|  | Test item 1 (blocking resistance (PC, coated paper)) | Fair |  | Good | Good |  | Poor | Exc. | Exc. |
|  | Test item 2 (adhesion (PC)) | Poor |  | Exc. | Exc. |  | Fair | Exc. | Exc. |
| Test item 3 (PC) | Evaluation of film stretchability | Exc. |  | Exc. | Exc. |  | Exc. | Exc. | Exc. |
|  | Evaluation of resistance to damage due to mold | Poor |  | Fair | Fair |  | Poor | Good | Exc. |
|  | Evaluation of release properties | Poor |  | Fair | Fair |  | Poor | Good | Exc. |
| Test item 4 (PETG) | Evaluation of film stretchability | Exc. |  | Exc. | Exc. |  | Exc. | Exc. | Exc. |
|  | Evaluation of resistance to damage due to mold | Fair |  | Good | Good |  | Fair | Exc. | Exc. |
|  | Evaluation of release properties | Fair |  | Good | Good |  | Fair | Exc. | Exc. |
| Test item 5 (PS) | Evaluation of film stretchability | Exc. |  | Exc. | Exc. |  | Exc. | Exc. | Exc. |
| Test item 6 (thick PC) | Evaluation of film stretchability | Exc. |  | Exc. | Exc. |  | Exc. | Exc. | Exc. |
|  | Evaluation of resistance to damage due to mold | Poor |  | Fair | Fair |  | Poor | Good | Exc. |
|  | Evaluation of release properties | Poor |  | Fair | Fair |  | Poor | Good | Exc. |
|  | Test item 7 (trimming suitability) | Exc. |  | Exc. | Exc. |  | Exc. | Exc. | Exc. |

Example 3

A commercial inkjet printer (Acuity 350, Fujifilm Corporation) was charged with magenta, yellow, and black Liquids A and cyan Liquid A1, and print samples (100%) were produced thereby. Within 10 minutes after printing, Liquid B was applied to a cured film of Liquid A by means of a roller coater charged with Liquids B1 to B14 shown in Tables 11 and 12. Printed materials were produced under conditions 1 shown in Table 7. The results of evaluation of printed materials produced under each of the conditions are shown in Tables 11 and 12.

TABLE 11

|  |  | B1 Ex. | B2 Ex. | B3 Ex. | B4 Ex. | B5 Ex. | B6 Comp. Ex. | B7 Comp. Ex. |
|---|---|---|---|---|---|---|---|---|
|  | Degree of cure | 100% | 100% | 100% | 100% | 100% | 100% | 100% |
|  | Test item 1 (blocking resistance (PC, coated paper)) | Exc. | Exc. | Exc. | Exc. | Exc. | Exc. | Exc. |
|  | Test item 2 (adhesion (PC)) | Exc. | Exc. | Exc. | Exc. | Exc. | Exc. | Exc. |
| Test item 3 (PC) | Evaluation of film stretchability | Exc. | Exc. | Exc. | Exc. | Exc. | Good | Exc. |
|  | Evaluation of resistance to damage due to mold | Exc. | Good | Exc. | Good | Exc. | Poor | Exc. |
|  | Evaluation of release properties | Exc. | Good | Fair | Exc. | Exc. | Exc. | Exc. |
| Test item 4 (PETG) | Evaluation of film stretchability | Exc. | Exc. | Exc. | Exc. | Exc. | Exc. | Exc. |
|  | Evaluation of resistance to damage due to mold | Exc. | Exc. | Exc. | Exc. | Exc. | Fair | Exc. |
|  | Evaluation of release properties | Exc. | Exc. | Good | Exc. | Exc. | Good | Exc. |
| Test item 5 (PS) | Evaluation of film stretchability | Exc. | Exc. | Exc. | Exc. | Exc. | Exc. | Exc. |
| Test item 6 (thick PC) | Evaluation of film stretchability | Exc. | Exc. | Exc. | Exc. | Exc. | Good | Exc. |
|  | Evaluation of resistance to damage due to mold | Exc. | Good | Exc. | Good | Exc. | Poor | Exc. |
|  | Evaluation of release properties | Exc. | Good | Fair | Exc. | Exc. | Exc. | Exc. |
|  | Test item 7 (trimming suitability) | Exc. | Exc. | Exc. | Exc. | Good | Exc. | Poor |

TABLE 12

|  |  | B8 Comp. Ex. | B9 Comp. Ex. | B10 Comp. Ex. | B11 Ex. | B12 Comp. Ex. | B13 Comp. Ex. | B14 Ex. |
|---|---|---|---|---|---|---|---|---|
|  | Degree of cure | 100% | 100% | 100% | 100% | 100% | 100% | 100% |
|  | Test item 1 (blocking resistance (PC, coated paper)) | Good | Poor | Exc. | Exc. | Exc. | Exc. | Exc. |
|  | Test item 2 (adhesion (PC)) | Good | Exc. | Exc. | Exc. | Exc. | Exc. | Exc. |
| Test item 3 (PC) | Evaluation of film stretchability | Exc. | Good | Exc. | Exc. | Exc. | Exc. | Exc. |
|  | Evaluation of resistance to damage due to mold | Good | Poor | Exc. | Exc. | Poor | Poor | Exc. |
|  | Evaluation of release properties | Poor | Poor | Exc. | Exc. | Poor | Poor | Exc. |
| Test item 4 (PETG) | Evaluation of film stretchability | Exc. | Poor | Exc. | Exc. | Exc. | Exc. | Exc. |
|  | Evaluation of resistance to damage due to mold | Fair | Poor | Exc. | Exc. | Fair | Fair | Exc. |
|  | Evaluation of release properties | Fair | Poor | Exc. | Exc. | Fair | Fair | Exc. |
| Test item 5 (PS) | Evaluation of film stretchability | Exc. | Exc. | Exc. | Exc. | Exc. | Exc. | Exc. |
| Test item 6 (thick PC) | Evaluation of film stretchability | Exc. | Good | Exc. | Exc. | Exc. | Exc. | Exc. |
|  | Evaluation of resistance to damage due to mold | Good | Poor | Exc. | Exc. | Poor | Poor | Exc. |
|  | Evaluation of release properties | Poor | Poor | Exc. | Exc. | Poor | Poor | Exc. |
|  | Test item 7 (trimming suitability) | Exc. | Exc. | Poor | Exc. | Exc. | Exc. | Exc. |

The resins (acrylic resins) used in the Examples were as shown in Table 13.

TABLE 13

|  | Constituent monomer | Tg (° C.) | Mw |
|---|---|---|---|
| ELVACITE 2013 | MMA, t-BMA | 80 | 34,000 |
| ELVACITE 2823 | MMA, n-BMA | 50 | 48,000 |
| ELVACITE 2927 | MMA, t-BMA | 45 | 19,000 |
| ELVACITE 3000 | MMA | 105 | 39,000 |
| ELVACITE 4026 | MMA | 75 | 33,000 |

Methods for measuring physical properties of the resins described in Table 13 were as follows.

<Measurement Conditions for Resin Molecular Weight>

The weight-average molecular weight of each polymer was measured using an HLC-8220GPC high performance liquid chromatograph (HPLC) (Tosoh Corporation).
1) Equipment: HLC-8220GPC manufactured by Tosoh Corporation
2) Column (manufacturer, column properties): TSK gel Super AWM-H 3 linked columns (6.0 mm I.D.×15 cm×3 columns) manufactured by Tosoh Corporation, microparticle gel using hydrophilic vinyl polymer as substrate
3) Solvent: N-methylpyrrolidone (10 mM LiBr)
4) Flow rate: 0.5 mL/min
5) Sample concentration: 0.1 mass
6) Amount injected: 60 µL
7) Temperature: 40° C.
8) Detector: differential refractive index detector (RI)

<Measurement Conditions for Tg of Resin>

The glass transition temperature (Tg) of each polymer was measured using an EXSTAR 6220 differential scanning calorimeter (DSC) (SII Nanotechnology Inc.).

In Table 13, MMA denotes methyl methacrylate and t-BMA denotes t-butyl methacrylate.

What is claimed is:

1. An image formation method comprising, in order,
Step a: a step of applying Liquid A to a substrate,
Step b: a step of irradiating the applied Liquid A with actinic radiation so as to carry out complete curing or semi-curing up to a degree of cure of at least 90% to form a cured or semi-cured layer,
Step c: a step of applying Liquid B to the cured or semi-cured layer, and
Step d: a step of completely curing any remaining Liquid A and Liquid B,
Liquid A comprising N-vinylcaprolactam, a first aromatic ring-containing monofunctional acrylate, an aliphatic hydrocarbon ring-containing monofunctional acrylate, a first polysiloxane compound, an acrylic resin having a glass transition temperature of 40° C. to 90° C., a first photopolymerization initiator, and a pigment, the content of the acrylic resin having the glass transition temperature of 40° C. to 90° C. in Liquid A being at least 0.5 mass % but no greater than 5 mass %, and
Liquid B comprising N-vinylcaprolactam, a second aromatic ring-containing monofunctional acrylate, a second polysiloxane compound, a thermoplastic resin having a glass transition temperature of 70° C. to 110° C., and a second photopolymerization initiator, the content of the thermoplastic resin having the glass transition temperature of 70° C. to 110° C. in Liquid B being at least 20 mass % but no greater than 50 mass %.

2. The image formation method according to claim 1, wherein Step a is carried out by inkjet printing.

3. The image formation method according to claim 1, wherein Step c is carried out by roll coater printing and/or screen printing.

4. The image formation method according to claim 1, wherein an interval between Step c and Step d is no greater than 10 seconds.

5. The image formation method according to claim 1, wherein Liquid A further comprises a difunctional aliphatic urethane acrylate oligomer, and the content of the difunctional aliphatic urethane acrylate oligomer in Liquid A is at least 0.5 mass % but no greater than 3.0 mass %.

* * * * *